(12) United States Patent
Kobayashi

(10) Patent No.: US 11,212,702 B2
(45) Date of Patent: Dec. 28, 2021

(54) SIGNAL PROCESSING APPARATUS AND METHOD

(71) Applicant: SONY SEMICONDUCTOR SOLUTIONS CORPORATION, Kanagawa (JP)

(72) Inventor: Seiji Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 162 days.

(21) Appl. No.: 16/488,695

(22) PCT Filed: Feb. 22, 2018

(86) PCT No.: PCT/JP2018/006417
§ 371 (c)(1),
(2) Date: Aug. 26, 2019

(87) PCT Pub. No.: WO2018/163840
PCT Pub. Date: Sep. 13, 2018

(65) Prior Publication Data
US 2021/0219172 A1 Jul. 15, 2021

(30) Foreign Application Priority Data

Mar. 8, 2017 (JP) .............................. JP2017-043812

(51) Int. Cl.
*H04W 28/06* (2009.01)
*H04W 28/04* (2009.01)

(52) U.S. Cl.
CPC ........... *H04W 28/06* (2013.01); *H04W 28/04* (2013.01)

(58) Field of Classification Search
CPC ...... H04W 28/06; H04W 28/04; H04H 20/59; H04N 21/2383; H04B 1/16
See application file for complete search history.

(56) References Cited

U.S. PATENT DOCUMENTS

| 5,930,287 A | 7/1999 | Kochi et al. |
| 2008/0144553 A1* | 6/2008 | Shao ....................... H04L 65/80 370/310 |

(Continued)

FOREIGN PATENT DOCUMENTS

| CN | 106664116 A | 5/2017 |
| EP | 0777337 A2 | 6/1997 |

(Continued)

OTHER PUBLICATIONS

International Search Report and Written Opinion of PCT Application No. PCT/JP2018/006417, dated May 15, 2018, 9 pages of ISRWO.

(Continued)

*Primary Examiner* — Syed Ali
(74) *Attorney, Agent, or Firm* — Chip Law Group

(57) ABSTRACT

The present technology relates to a signal processing apparatus and method which are able to suppress a reduction in reception sensitivity. A reception signal is compressed so as to have a predetermined signal level or lower, and transmission data transmitted from a transmitter side and included in the reception signal compressed so as to have the signal level or lower is decoded. For example, an approximate replica signal reproducing large amplitude changes of the reception signal is generated, and the approximate replica signal is subtracted from the reception signal to compress the reception signal so as to have the signal level or lower. The present disclosure is applicable to, for example, a signal processing apparatus, a reception apparatus, a transmission/reception apparatus, a communication apparatus, an information processing apparatus, an electronic device, a computer, a program, a storage medium, a system, and so on.

9 Claims, 31 Drawing Sheets

(56) References Cited

U.S. PATENT DOCUMENTS

| | | | |
|---|---|---|---|
| 2009/0262794 A1* | 10/2009 | Dally | H04L 1/0042 |
| | | | 375/230 |
| 2014/0378079 A1* | 12/2014 | Adnani | H04B 1/406 |
| | | | 455/266 |
| 2015/0020134 A1* | 1/2015 | Bowler | H04L 12/2861 |
| | | | 725/116 |
| 2016/0277050 A1* | 9/2016 | Kato | H04B 7/08 |
| 2017/0207814 A1 | 7/2017 | Kobayashi et al. | |
| 2018/0007398 A1* | 1/2018 | Bleidt | H04N 21/8106 |
| 2018/0295633 A1* | 10/2018 | Abdelmonem | H04L 5/0073 |

FOREIGN PATENT DOCUMENTS

| | | | |
|---|---|---|---|
| JP | 09-214397 A | | 8/1997 |
| JP | 4443991 B2 | | 3/2010 |
| JP | 2010-252249 A | | 11/2010 |
| JP | 2010252249 A | * | 11/2010 |
| JP | 2016-046618 A | | 4/2016 |
| WO | 2016/027443 A1 | | 2/2016 |

OTHER PUBLICATIONS

Tada, et al., "High anti-interference performance of 802.15.4k DSSS systems to coexist with others in 920 M Hz band", IEICE Technical Report, vol. 114, No. 84, Jun. 16, 2014, 3 pages.

Tada, et al., "High Anti-interference Performance of 802.15.4k DSSS Systems to coexist with Others in 920 MHz band", IEICE Technical Report, Short Range Wireless Communications, SRW2014-7, vol. 114, No. 84, Jun. 16, 2014, pp. 35-39.

* cited by examiner

SIGNAL PROCESSING APPARATUS AND METHOD

CROSS REFERENCE TO RELATED APPLICATIONS

This application is a U.S. National Phase of International Patent Application No. PCT/JP2018/006417 filed on Feb. 22, 2018, which claims priority benefit of Japanese Patent Application No. JP 2017-043812 filed in the Japan Patent Office on Mar. 8, 2017. Each of the above-referenced applications is hereby incorporated herein by reference in its entirety.

TECHNICAL FIELD

The present technology relates to a signal processing apparatus and method, and, in particular, to a signal processing apparatus and method which are able to suppress a reduction in reception sensitivity.

BACKGROUND ART

In the past, a system for transmitting information from a sensor or the like using, for example, electric waves in a 920 Mz band has been conceived of as a technique for implementing long-distance wireless communication (see, for example, PTL 1). Use of a system described in PTL 1 enables a short time to be set as a maximum continuous transmission time, enabling transmission with a channel selected from among many frequency channels, resulting in a construction of a transmission/reception system with increased resistance to interference. In addition, performing additions of a large number of short-time frames enables an improvement in effective SNR without a limit of a maximum transmission time defined in the Radio Law being exceeded. At this time, because a synchronization signal is spread over a whole frame, even when a phase fluctuation has occurred within the frame, phase and frequency corrections can be accomplished more appropriately. As a result, even a reception signal that is buried in noise and which is so weak that it is difficult to decode the reception signal by a conventional method, for example, can be decoded with increased accuracy. That is, an improvement in reception sensitivity can be achieved to enable wireless communication over a longer distance.

However, when wireless communication over a longer distance has been made possible due to the improvement in the reception sensitivity, a need to detect a signal of the present system from among a greater number of signals may arise. Accordingly, a reception signal may sometimes contain an extremely strong interfering wave, and in a case where this happens, a detection of a signal of the present system may become difficult. That is, a reduction in the reception sensitivity may occur. A method of generating a replica of a reception signal has been conceived of as a method for suppressing interference with a separation of a plurality of signals (see, for example, PTL 2).

CITATION LIST

Patent Literature

[PTL 1]
  Japanese Patent Laid-open No. 2016-46618
[PTL 2]
  Japanese Patent No. 4443991

SUMMARY

Technical Problems

With this method, however, generation of a replica is not possible unless a signal that may become an interference wave is known. However, since the 920 MHz band is a frequency range that does not require a license, a variety of modulation schemes and frequency ranges are used for interference waves, which it may be impossible to identify on a receiver side. Therefore, it is difficult to generate a proper replica for an unknown interference wave to suppress interference. Accordingly, an occurrence of interference may result in a reduction in the reception sensitivity.

The present disclosure has been conceived in view of the above circumstances to suppress a reduction in reception sensitivity.

Solution to Problems

A signal processing apparatus according to one aspect of the present technology is a signal processing apparatus including: a signal compression unit configured to compress a reception signal so as to have a predetermined signal level or lower; and a decoding unit configured to decode transmission data transmitted from a transmitter side, the transmission data being included in the reception signal compressed by the signal compression unit so as to have the signal level or lower.

The signal compression unit can include: an approximate replica generation unit configured to generate an approximate replica signal reproducing large amplitude changes of the reception signal; and a subtraction unit configured to subtract the approximate replica signal generated by the approximate replica generation unit from the reception signal.

The approximate replica generation unit includes a quantization unit configured to coarsely quantize the reception signal, and the subtraction unit can be configured to subtract, as the approximate replica signal, the quantized reception signal obtained by the quantization unit from the reception signal.

The quantization unit can quantize the reception signal from a bit depth of 16 bits to a bit depth of 4 bits.

The approximate replica generation unit can generate an approximate replica signal for a portion of the reception signal which exceeds the signal level.

The approximate replica generation unit includes: a phase detection unit configured to detect a phase of the reception signal; an envelope detection unit configured to detect an envelope of the reception signal; a complex composition unit configured to subject a phase detection result of the reception signal obtained by the phase detection unit and an envelope detection result of the reception signal obtained by the envelope detection unit to complex composition; and a determination unit configured to determine whether or not the envelope detection result of the reception signal obtained by the envelope detection unit exceeds the signal level. The subtraction unit can be configured to subtract, as the approximate replica signal, a complex composition result of the phase detection result and the envelope detection result obtained by the complex composition unit from the reception signal, with respect to a portion of the reception signal with respect to which the determination unit has determined that the envelope detection result exceeds the signal level.

The approximate replica generation unit further includes an attenuation unit configured to attenuate an amplitude of the complex composition result at a predetermined attenuation factor, and the subtraction unit can be configured to subtract, as the approximate replica signal, the complex composition result with the amplitude thereof attenuated at the attenuation factor by the attenuation unit from the reception signal, with respect to the portion of the reception signal with respect to which the determination unit has determined that the envelope detection result exceeds the signal level.

The approximate replica generation unit further includes a quantization unit configured to coarsely quantize an amplitude of the complex composition result, and the subtraction unit can be configured to subtract, as the approximate replica signal, the complex composition result quantized by the quantization unit from the reception signal, with respect to the portion of the reception signal with respect to which the determination unit has determined that the envelope detection result exceeds the signal level.

The signal compression unit can further include a waveform shaping unit configured to shape a waveform of a difference between the reception signal and the approximate replica signal obtained by the subtraction unit.

The waveform shaping unit can include a limiting unit configured to limit an amplitude of the difference to a predetermined signal level or lower.

The waveform shaping unit can include a low-pass filter configured to limit high-frequency components of the difference.

The signal compression unit can include a low-pass filter configured to limit high-frequency components of the reception signal.

The signal level can include a thermal noise level.

A signal processing method according to one aspect of the present technology is a signal processing method including: compressing a reception signal so as to have a predetermined signal level or lower; and decoding transmission data transmitted from a transmitter side, the transmission data being included in the reception signal compressed so as to have the signal level or lower.

In the signal processing apparatus and method according to one aspect of the present technology, the reception signal is compressed so as to have the predetermined signal level or lower, and the transmission data transmitted from the transmitter side and included in the reception signal compressed so as to have the signal level or lower is decoded.

Advantageous Effect of Invention

The present technology allows signal processing. In addition, the present technology is able to suppress a reduction in reception sensitivity.

DESCRIPTION OF EMBODIMENTS

Figure 1:
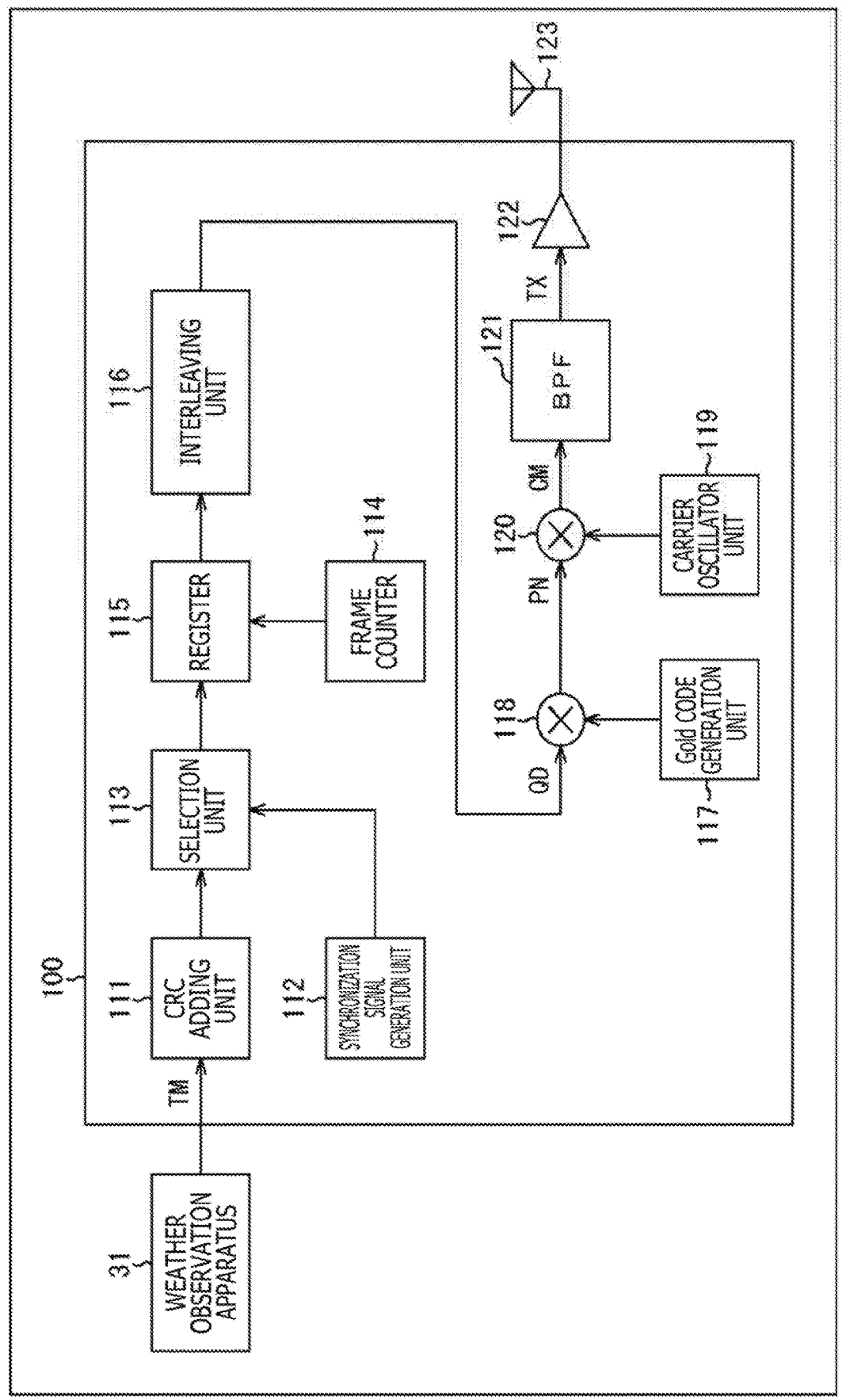
FIG. 1 is a block diagram illustrating an exemplary structure of primary parts of a transmission apparatus.

Hereinafter, modes for carrying out the present disclosure (hereinafter referred to as embodiments) will be described. Descriptions will be provided in the following order.
1. Interference suppression
2. Transmission apparatus
3. First embodiment (reception apparatus)
4. Second embodiment (interference suppression processing unit)

5. Third embodiment (interference suppression processing unit)

6. Fourth embodiment (interference suppression processing unit)

7. Others

1. Interference Suppression

<Long-Distance Wireless Communication>

In connection with wireless communication in which digital data is transmitted and received, the distance limit of the wireless communication is determined by the transmission power with which an electric wave is transmitted, the performance of aerials used for transmission and reception, and the transmission rate. An increase in the transmission power, which directly affects the power consumption of a transmitter, naturally has a limit. An improvement in the performance of the aerial can be achieved by using a Yagi-Uda antenna or the like, but because higher performance of an antenna involves a larger and more complicated structure, the performance of an aerial available for use is limited.

In addition, restrictions are imposed on the transmission power by the Radio Law. Furthermore, depending on the frequency band of electric waves, restraints are imposed by the Radio Law on the performance of the aerial as well as the transmission power. As a result, the performance of the aerial and the transmission power which are available for actual use are limited.

DSSS (Direct-Sequence Spread Spectrum), for example, is known as a technique for implementing long-distance wireless communication free from such constraints. DSSS is a technique that enables high-sensitivity reception while eliminating influence of noise, by performing additions while multiplying a received signal by a spreading code. The sensitivity can be linearly increased by extending the time for the additions (i.e., by reducing the transmission rate), and in the GPS (Global Positioning System), in which DSSS is adopted, for example, stable reception of signals is possible even under a field strength of −150 dBm.

In the GPS, transmission electric waves are continuously transmitted with stable phase. Accordingly, stable phase synchronization can be established, even in a low SNR (Signal to Noise Ratio) condition, by adopting a low-bandwidth PLL (Phase Locked Loop) or DLL (Delayed Locked Loop). With the phase being proper, weak signals can be detected by a detection involving additions of signals. In a case where a dedicated radio frequency band has been allocated as in the GPS, a long-time continuous transmission is thus possible, and stable reception of even weak signals is possible.

There is, for example, a system for transmitting information from a sensor or the like using electric waves in the 920 Mz band. The 920 MHz band is a frequency band made available for public use by the Ministry of Internal Affairs and Communications in July 2011, and can be used by any person without a license. However, the maximum continuous transmission time is restricted to four seconds by a standard (ARIB (Association of Radio Industries and Businesses) STD T-108). Furthermore, when the continuous transmission time is shortened, for example, to 0.2 seconds, more channels are allocated, enabling transmission and reception in a condition of reduced interference.

Because of such restrictions on the continuous transmission time, the 920 MHz band does not allow a low-bandwidth PLL or DLL to be mounted on a receiver side. Accordingly, a lower limit of the transmission rate is set, which may result in a limited upper limit of the reception sensitivity. That is, such restrictions may result in a reduction in the reception sensitivity. For example, a wireless communication device on the market for the 920 MHz band has a reception sensitivity limit of substantially −100 dBm to substantially −120 dBm, which may result in a sensitivity difference of tens of dB compared to the GPS.

Accordingly, as described in PTL 1, a system for transmitting information from a sensor or the like using, for example, electric waves in the 920 Mz band has been conceived of as a technique for implementing long-distance wireless communication. Use of the system described in PTL 1 enables a short time to be set as the maximum continuous transmission time, enabling transmission with a channel selected from among many frequency channels, resulting in a construction of a transmission/reception system with increased resistance to interference. In addition, performing additions of a large number of short-time frames enables an improvement in effective SNR without a limit of the maximum transmission time stipulated in the Radio Law being exceeded. At this time, because a synchronization signal is spread over the whole frame, even when a phase fluctuation has occurred within the frame, phase and frequency corrections can be accomplished more appropriately. As a result, even a reception signal that is buried in noise and which is so weak that it is difficult to decode the reception signal by a conventional method, for example, can be decoded with increased accuracy. That is, an improvement in the reception sensitivity can be achieved to enable wireless communication over a longer distance.

However, when wireless communication over a longer distance has been made possible due to the improvement in the reception sensitivity, a need to detect a signal of the present system from among a greater number of signals may arise. Accordingly, a reception signal may sometimes contain an extremely strong interfering wave, and in a case where this happens, a detection of a signal of the present system may become difficult. That is, a reduction in the reception sensitivity may occur. As described in PTL 2, for example, a method of generating a replica of a reception signal has been conceived of as a method for suppressing interference with a separation of a plurality of signals.

With this method, however, generation of the replica is not possible unless a signal that may become an interference wave is known. However, since the 920 MHz band is a frequency range that does not require a license, a variety of modulation schemes and frequency ranges are used for interference waves, which it may be impossible to identify on the receiver side. Therefore, it is difficult to generate a proper replica for an unknown interference wave to suppress interference. Accordingly, an occurrence of interference may result in a reduction in the reception sensitivity.

Accordingly, it is so arranged that a reception signal is compressed so as to have a predetermined signal level or lower, and transmission data transmitted from a transmitter side and included in the reception signal compressed so as to have the signal level or lower is decoded. With a method described in PTL 1, it is possible to detect a reception signal of the present system even when the reception signal is buried in, for example, thermal noise. In other words, reducing the levels of all signals to a level of the thermal noise, thereby reducing the influence of a strong interfering wave, makes it possible to detect a reception signal of the present system by the method described in PTL 1. That is, the reduction in the reception sensitivity can be suppressed.

Note that the predetermined signal level mentioned above may be any level that allows a reception signal of the present system to be detected, and may be equal to, higher than, or lower than the level (i.e., a thermal noise level) of the thermal noise.

2. Transmission Apparatus

<Structure of Transmission Apparatus>

FIG. 1 is a diagram illustrating a configuration example of primary parts of a transmission apparatus that transmits a signal to be processed in a signal processing apparatus to which the present technology has been applied. A transmission apparatus 100 illustrated in FIG. 1 is an apparatus that transmits weather observation data TM supplied from a weather observation apparatus 31 in the form of an electric wave (i.e., a wireless signal) via an antenna 123.

The weather observation apparatus 31 is an apparatus that observes weather data including, for example, atmospheric temperature, sunshine, rainfall, wind direction, wind speed, and so on. The weather observation apparatus 31 is provided with various types of sensors required to observe such weather data, and a control unit that controls the sensors. The weather observation apparatus 31 supplies the observed weather data (i.e., the weather observation data) to the transmission apparatus 100. Assuming, for example, that the amount of information for each of the atmospheric temperature, the rainfall, the wind direction, and the wind speed is 1 octet (i.e., 8 bits), the amount of information for the weather observation data TM is 4 octets (i.e., 32 bits).

The weather observation apparatus 31 is installed, for example, at a place at which an observation of weather data by man power is difficult, such as in a mountainous region, or, for example, at a place that is not easily accessible to a human. The transmission apparatus 100 is installed in the vicinity of the weather observation apparatus 31. That is, the weather observation apparatus 31 and the transmission apparatus 100 are installed at a place at which a large-scale external power supply is not easily available. Therefore, these apparatuses need to be driven with a small-scale power supply, such as a battery, a solar photovoltaic power generator, or the like. That is, there is a demand for these apparatuses to be driven with a lower power consumption.

In addition, the weather observation data supplied from the weather observation apparatus 31 is transmitted to a reception apparatus installed, for example, in an urban area near a base of a mountain or the like (e.g., in a research facility of a university or the like, or in a facility such as a data center or the like). The reception apparatus supplies the received weather observation data to a server or the like. That is, the transmission apparatus 100 needs to transmit the wireless signal to a location at a long distance. Note that a lighting power supply can be used for the reception apparatus installed near the mountain base. Accordingly, the reception apparatus may have a high-performance CPU (Central Processing Unit) installed therein to perform sophisticated computations.

To sum up the foregoing, such a low power consumption is demanded of the transmission apparatus 100 as to allow the transmission apparatus 100 to be driven with a battery. Meanwhile, such a high-sensitivity reception performance is demanded of the reception apparatus as to enable long-distance communication. In addition, regarding a communication channel, a time for a continuous transmission is limited. While there are such severe requirements, a high transmission rate is not required because the amount of information to be transmitted is small. In addition, it does not matter when a receiving station has a high power consumption.

Figure 2:
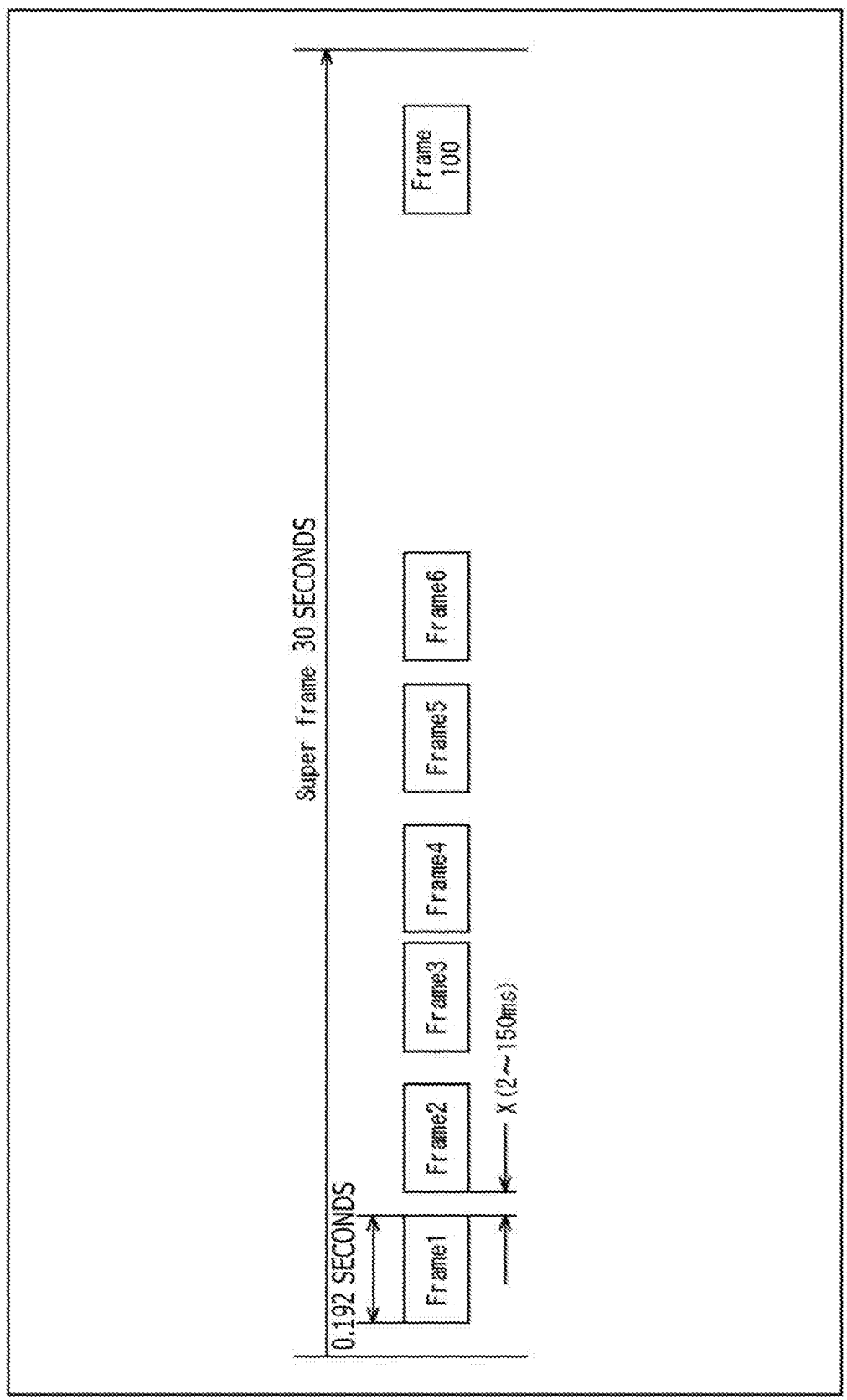
FIG. 2 is a diagram illustrating a configuration example of primary parts of a super frame.

FIG. 2 illustrates the overall frame structure of a transmission signal transmitted by the transmission apparatus 100. As illustrated in FIG. 2, it is assumed that a continuous transmission time for one transmission instance is 0.192 seconds. That is, because the continuous transmission time is shorter than 0.2 seconds, many transmission channels can be allocated for this transmission. As a result, a less crowded channel can be chosen from among the many for the transmission, which may result in a construction of a system with increased resistance to interference. With adoption of the present technology, a high-sensitivity transmission/reception system that allows use of such a short frame length can be constructed.

Transmission of frames is performed in units of super frames, with a time for data transmission of one super frame being 30 seconds. During the 30 seconds, 0.192-second frames are repeated a maximum of 100 times. Here, a gap x between the frames is at least 2 ms or longer. The gap x varies each time depending on the result of carrier sensing (i.e., how much the channel is crowded). The transmission is performed such that, during the 30 seconds, one frame is transmitted in an average of approximately 0.3 seconds. As a result, 100 frames are transmitted during the 30 seconds. The number of frames that can be transmitted may vary a little depending on how much the channel is crowded. Signals transmitted with the 100 frames may be arbitrary signals, but it is assumed in the following description that all the signals are identical.

As illustrated in FIG. 1, the transmission apparatus 100 includes a CRC (Cyclic Redundancy Check) adding unit 111, a synchronization signal (SYNC) generation unit 112, a selection unit 113, a frame counter 114, a register 115, an interleaving unit 116, a Gold code generation unit 117, a multiplication unit 118, a carrier oscillator unit 119, a multiplication unit 120, a band-pass filter 121, an amplification unit 122, and the antenna 123.

The CRC adding unit 111 adds a cyclic redundancy check code (CRC) for error detection to the weather observation data TM supplied from the weather observation apparatus 31, and supplies the resultant to the selection unit 113. This cyclic redundancy check code may be any applicable code, and may have any data length.

The synchronization signal generation unit 112 generates a predetermined synchronization pattern, and supplies it to the selection unit 113. This synchronization pattern may be any applicable pattern, and may have any data length.

Selecting an appropriate input, the selection unit 113 adds the synchronization pattern supplied from the synchronization signal generation unit 112 to the weather observation data TM with the cyclic redundancy check code added thereto supplied from the CRC adding unit 111, thus generating transmission data QD.

The selection unit 113 supplies the transmission data QD, i.e., the weather observation data TM with the cyclic redundancy check code and the synchronization pattern added thereto as described above, to the register 115.

Figure 3:
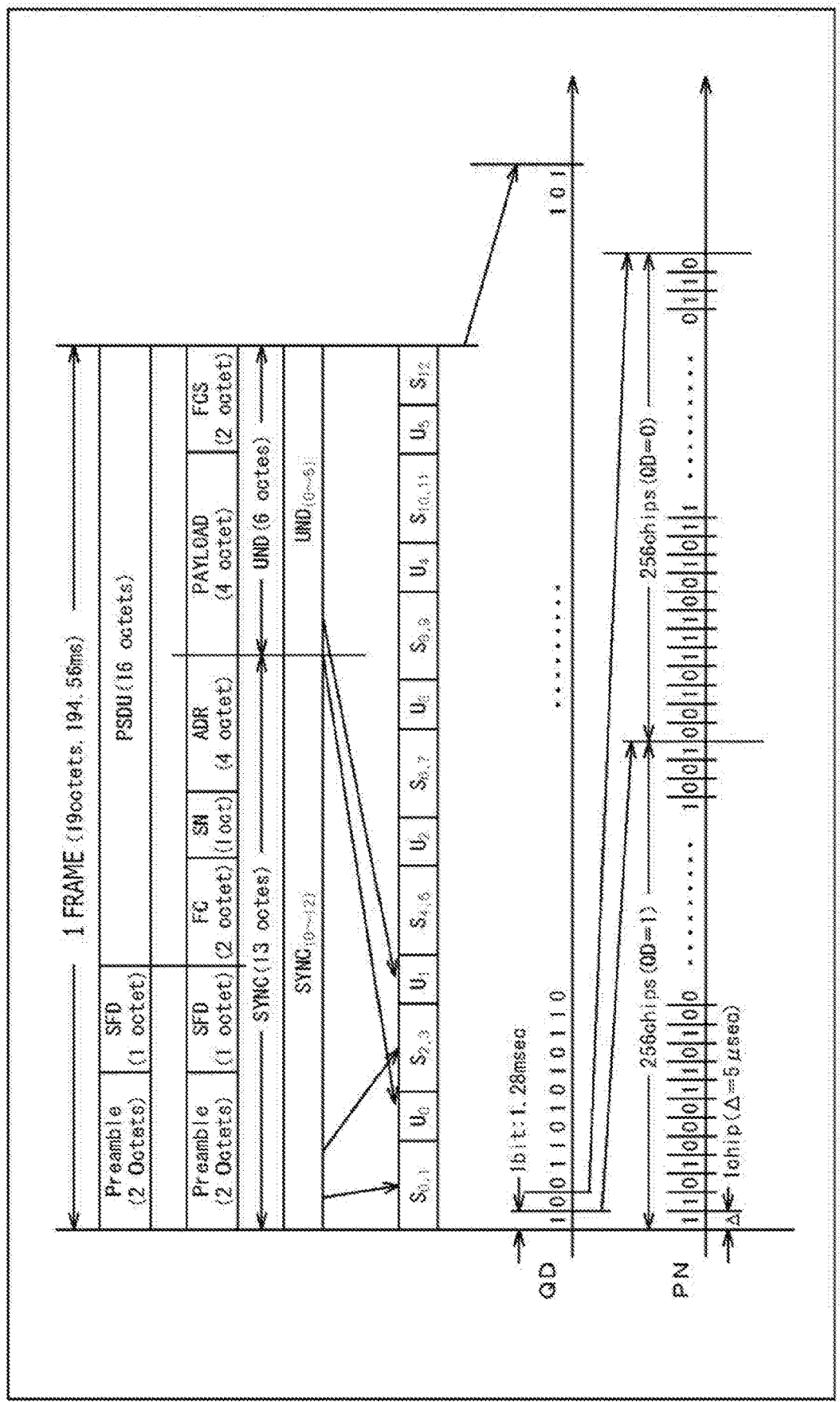
FIG. 3 is a diagram for explaining examples of signals at various parts.

FIG. 3 is a schematic diagram illustrating the frame structure (i.e., Frame Format) of a transmission packet. As illustrated in a top row in FIG. 3, the transmission packet includes a 2-octet preamble, a 1-octet SFD (Start-Of-Frame Delimiter), and 16-octet PSDU (PHY Service Data Unit). Here, each of the preamble and the SFD is fixed data. The preamble may be, for example, a bit string of "0011111101011001." Meanwhile, the SFD may be, for example, a bit string of "00011100."

As illustrated in a second row from the top in FIG. 3, the 16-octet PSDU includes a frame control (FC), a sequence number (SN), transmitter and receiver addresses (ADR), a payload (PAYLOAD), and a frame check sequence (FCS).

The frame control (FC) is 2-octet digital information, and is information indicating the structure, the number of bits, etc., of information that follows the frame control. The frame control is a fixed bit string, and may be, for example, a bit string of "0010000000100110." The sequence number (SN) is 1-octet digital information, and the value thereof is increased every time new data is transmitted. On the receiver side, it can be determined whether or not data is new data by checking the sequence number. The transmitter and receiver addresses (ADR) are 4-octet information, and are information of a transmitter address number for identifying a transmitter and a receiver address number for identifying a receiver. The payload (PAYLOAD) is 4-octet digital information, and the weather observation data TM as it is is set therein. The frame check sequence (FCS) is a 2-octet cyclic redundancy check code, and is information for checking whether or not an error has occurred in communication data.

The CRC adding unit 111 adds, to a payload (PAYLOAD) which is a copy of the weather observation data TM supplied from the weather observation apparatus 31, a frame check sequence (FCS) obtained by a computation for this payload, and supplies the resultant to the selection unit 113. Each of the weather observation data TM, which is transmitted as the payload (PAYLOAD), and the frame check sequence (FCS) is information that cannot be inferred in advance on the receiver side. Such information that is "unknown" on the receiver side will be referred to as UND (UNknown Data). While the UND is formed by 6-octet information in the example of FIG. 3, the UND may have an arbitrary content and an arbitrary amount of data.

The synchronization signal generation unit 112 generates, as the synchronization pattern (SYNC), information of the preamble, the SFD, the frame control, the sequence number, and the transmitter and receiver addresses, for example, and supplies it to the selection unit 113. This synchronization pattern (SYNC) is information that does not depend on the weather observation data TM, and is known information for the reception apparatus. While the synchronization pattern is formed by 13-octet information in the example of FIG. 3, the synchronization pattern may have an arbitrary content and an arbitrary amount of data. For example, the synchronization pattern (SYNC) may include information other than the information mentioned above, and also, a part of or the whole of the information mentioned above may not be included in the synchronization pattern (SYNC).

The selection unit 113 adds the synchronization pattern supplied from the synchronization signal generation unit 112 to the payload with the frame check sequence added thereto supplied from the CRC adding unit 111, thus generating the transmission data QD.

The frame counter 114 illustrated in FIG. 1 is a counter that counts the number of frames that have been transmitted, and counts it from 0 to 99, and supplies the count value to the register 115.

The register 115 is a 19-octet (i.e., 152-bit) register. When the count value supplied from the frame counter 114 is "0," the register 115 takes and retains therein an output (i.e., transmission data QD corresponding to one frame) from the selection unit 113. The register 115 continues to retain the transmission data QD corresponding to one frame until the count value supplied from the frame counter 114 becomes "0" next time. The register 115 supplies the retained value to the interleaving unit 116 when appropriate. That is, the same transmission data QD continues to be outputted from the register 115 during the period of a super frame. When the count value supplied from the frame counter 114 has become "0" next time, the register 115 takes and retains therein a new output (i.e., transmission data QD corresponding to one frame) from the selection unit 113.

As illustrated in a fourth row from the top in FIG. 3, the interleaving unit 116 splits the synchronization pattern (SYNC) into parts, and spreads the parts among the UND. This spreading is performed such that the synchronization pattern (SYNC) is distributed substantially evenly. In other words, the interleaving unit 116 rearranges the transmission data QD such that the part thereof which is known on the receiver side will be more evenly spread among the transmission data.

In the case of the example of FIG. 3, the synchronization pattern (SYNC) is 13-octet information, and the UND is 6-octet information. Assuming that the 13-octet synchronization pattern (SYNC) is split into 1-octet parts, SYNC0 to SYNC12, and the 6-octet UND is split into 1-octet parts, UND0 to UND5, the interleaving unit 116 rearranges them in the following order, for example.

SYNC0, SYNC1, UND0, SYNC2, SYNC3, UND1, . . . , UND5, SYNC12

When the transmission is performed with the synchronization pattern known to the reception apparatus distributed (i.e., spread) over the whole frame as described above, an estimation of the initial phase and frequency of a transmission carrier can be accurately accomplished in units of short frames in the reception apparatus that receives the signal. As a result, the reception apparatus is capable of high-sensitivity reception even with a short continuous transmission time.

In a fifth row from the top in FIG. 3, an example of the rearranged transmission data QD is illustrated. The interleaving unit 116 supplies the transmission data QD rearranged as described above to the multiplication unit 118.

The Gold code generation unit 117 includes two M-sequence (Maximum Sequence) generators, and generates a pseudorandom sequence having a length of 256 bits (i.e., 256 chips). The Gold code generation unit 117 generates, for example, a bit string with a predetermined pattern having a length of 256 bits as the pseudorandom sequence. This pseudorandom sequence may be any applicable sequence, and may have any data length. The Gold code generation unit 117 supplies it to the multiplication unit 118.

The multiplication unit 118 multiplies the rearranged transmission data QD supplied from the interleaving unit 116 by the pseudorandom sequence supplied from the Gold code generation unit 117, thus generating a pseudorandom sequence PN. More specifically, the multiplication unit 118 assigns a pseudorandom sequence to each bit of the transmission data QD, and thus generates a pseudorandom sequence PN having 38400 bits (i.e., 152 bits×256 chips) from each transmission packet.

Here, between the pseudorandom sequence assigned to each "0" bit (QD=0) of the transmission data QD and the pseudorandom sequence assigned to each "1" bit (QD=1) of the transmission data QD, the value of each bit is reversed. Specifically, for example, the multiplication unit 118 assigns the pseudorandom sequence to each "0" bit (QD=0) of the transmission data QD, and assigns the pseudorandom sequence with the value of each bit reversed to each "1" bit (QD=1) of the transmission data QD. More specifically, as illustrated in the bottom row in FIG. 3, for example, the multiplication unit 118 assigns a pseudorandom sequence "1101000110100 . . . 1001" to each "1" bit (QD=1) of the transmission data QD, and assigns a pseudorandom sequence "0010111001011 . . . 0110" to each "0" bit (QD=0) of the transmission data QD.

This pseudorandom sequence PN has a spreading factor of 256 and a chip duration Δ of 5 μs. The multiplication unit 118 supplies the pseudorandom sequence PN generated as described above to the multiplication unit 120.

The carrier oscillator unit 119 generates a carrier frequency used for radio transmission, and supplies it to the multiplication unit 120. The multiplication unit 120 modulates the polarity of the carrier frequency in accordance with the pseudorandom sequence PN, thus performing a BPSK modulation as a DSSS scheme.

That is, the modulation is performed such that the phase of the carrier is shifted to n for "1" in the pseudorandom sequence PN, and the phase of the carrier is shifted to −π (polarity inversion) for "0" in the pseudorandom sequence PN.

The multiplication unit 120 supplies the result of the modulation as a modulated signal CM to the band-pass filter (BPF) 121.

The modulated signal CM subjected to the polarity inversion as described above has undergone abrupt changes at shifting points, and therefore has a wide variety of frequency components. If it were transmitted wirelessly as it is, that might affect wireless communications using similar bands.

Accordingly, the band-pass filter 121 limits the frequency components of the modulated signal CM to those near the carrier frequency. The band-pass filter 121 supplies, as a transmission signal TX, the modulated signal CM subjected to the band limiting as described above to the amplification unit 122.

The amplification unit 122 amplifies the supplied transmission signal TX, and causes the resultant to be radiated as an electric wave (i.e., a wireless signal) via the antenna 123. That is, the amplification unit 122 transmits, as a wireless signal, the amplified transmission signal TX through the antenna 123.

In the above-described manner, a transmission frame is transmitted through the antenna 123 as a frame having a duration of 0.2 seconds or shorter with the synchronization pattern (SYNC) known to the reception apparatus being distributed substantially evenly over the frame. The transmission apparatus 100 is thus able to suppress the reduction in the reception sensitivity.

In other words, the transmission apparatus 100 is able to accomplish transmission of a wireless signal over a longer distance while controlling an increase in power consumption of the whole apparatus. Accordingly, adoption of this transmission apparatus 100 makes it easier to realize a system for transmitting the weather observation data obtained in the weather observation apparatus 31 installed, for example, at a place at which the observation of the weather data by man power is difficult, such as in a mountainous region, and at which a large-scale external power supply is not easily available, to, for example, an urban area near a base of a mountain or the like (e.g., to a research facility of a university or the like, or to a facility such as a data center or the like).

<Flow of Transmission Process>

Figure 4:
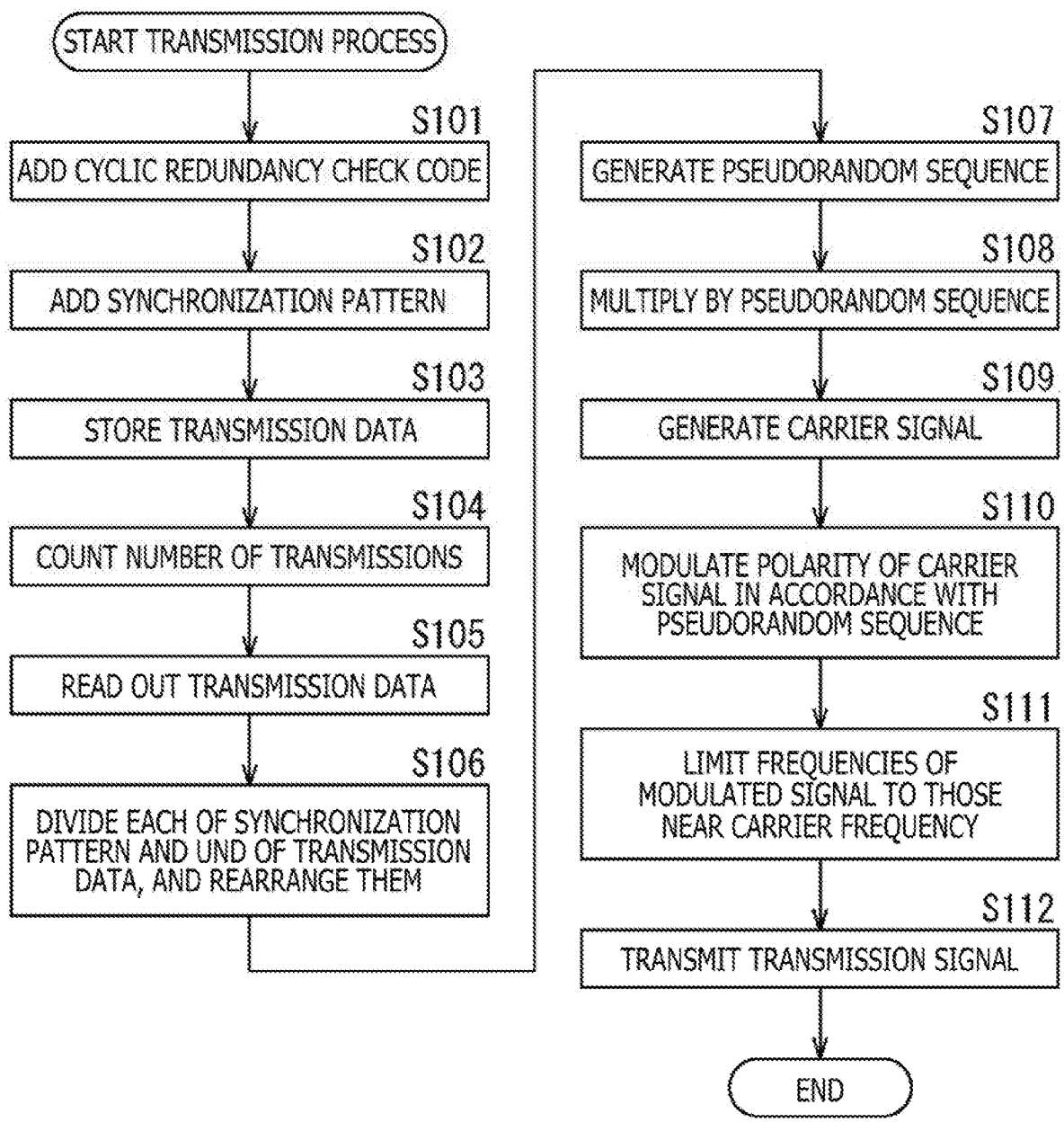
FIG. 4 is a flowchart for explaining an example flow of a transmission process.

Next, an example flow of a transmission process performed in the transmission apparatus 100 as described above will now be described below with reference to a flowchart of FIG. 4. Once data (e.g., the weather observation data) to be transmitted is inputted, the transmission apparatus 100 starts the transmission process.

Once the transmission process is started, the CRC adding unit 111 adds the cyclic redundancy check code (CRC) to the data (i.e., the payload) to be transmitted at step S101.

At step S102, the synchronization signal generation unit 112 generates the predetermined synchronization pattern (which is known to the reception apparatus), and the selection unit 113 adds the synchronization pattern to the data to be transmitted, thus generating the transmission data QD corresponding to one frame.

At step S103, the register 115 stores the transmission data QD corresponding to one frame generated at step S102 at a timing at which the count value of the frame counter 114 is "0."

At step S104, the frame counter 114 counts the number of transmissions of the transmission data QD corresponding to one frame retained in the register 115.

At step S105, the interleaving unit 116 reads out the transmission data QD corresponding to one frame retained in the register 115.

At step S106, the interleaving unit 116 divides each of the synchronization pattern and the UND of the transmission data QD into parts, and rearranges them such that the synchronization pattern will be spread more evenly.

At step S107, the Gold code generation unit 117 generates a predetermined pseudorandom sequence.

At step S108, the multiplication unit 118 multiplies the rearranged transmission data QD by the pseudorandom sequence, thus generating the pseudorandom sequence PN.

At step S109, the carrier oscillator unit 119 generates the carrier signal.

At step S110, the multiplication unit 120 modulates the polarity of the carrier signal in accordance with the pseudorandom sequence PN, thus generating the modulated signal.

At step S111, the band-pass filter 121 limits the frequencies of the modulated signal to those near the carrier frequency, and thus generates the transmission signal TX.

At step S112, the amplification unit 122 amplifies the transmission signal TX, and transmits, as a wireless signal, the amplified transmission signal TX through the antenna 123.

The processes of the above-described steps may be performed in any desired order, and may be performed in parallel, and also may be performed repeatedly as necessary. In addition, the processes of the transmission process are repeatedly performed for each frame while the input of data to be transmitted continues.

With the transmission process being performed in the above-described manner, the transmission apparatus 100 is able to transmit the transmission frame, with the synchronization pattern (SYNC) known to the reception apparatus being spread substantially evenly over the transmission frame, as a frame having a duration of 0.2 seconds or shorter, and this leads to suppressing the reduction in the reception sensitivity.

Note that, although it has been assumed in the foregoing description that the transmission apparatus 100 performs the BPSK modulation, the amount of phase shift may be arbitrarily determined, and is not limited to that of the above example. For example, a QPSK (Quadrature Phase-Shift Keying) modulation may alternatively be performed. In the case of the QPSK modulation, the amount of phase shift is $\pi/2$, and a carrier wave has four phases, 0, $\pi/2$, $\pi$, and $3\pi/2$. In this case, the Gold code generation unit 117 of the transmission apparatus 100 may be configured to generate such a pseudorandom sequence as to subject the transmission data sequence QD to four-phase shifting, and the multiplication unit 118 may be configured to multiply the transmission data sequence QD by that pseudorandom sequence, thus generating such a pseudorandom sequence PN as to subject the carrier frequency to the QPSK modulation (quadrature phase-shift keying modulation).

3. First Embodiment

<Reception Apparatus>

Figure 5:
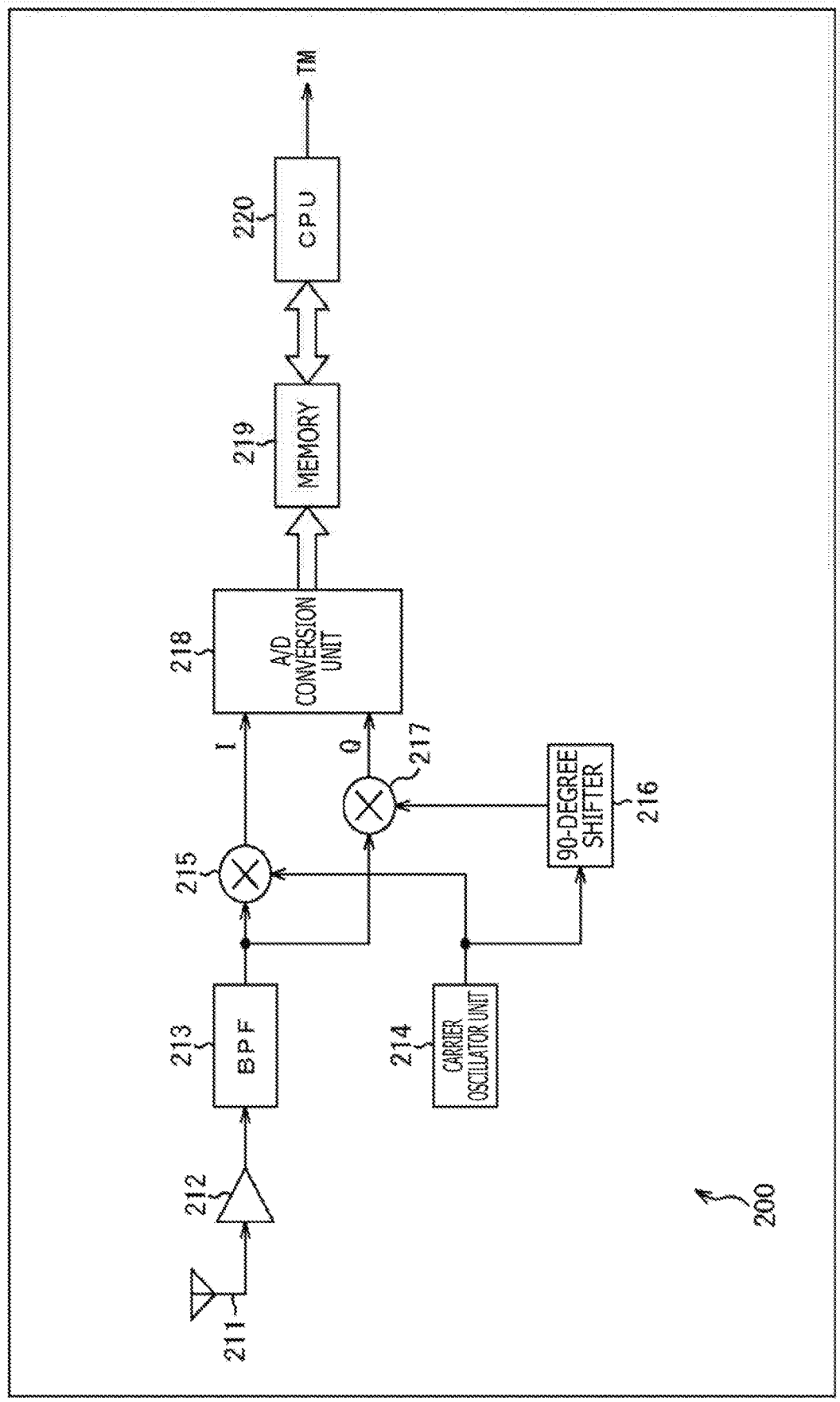
FIG. 5 is a block diagram illustrating a configuration example of primary parts of a reception apparatus.

FIG. 5 is a diagram illustrating a configuration example of primary parts of a reception apparatus according to one embodiment of the signal processing apparatus to which the present technology has been applied. A reception apparatus 200 illustrated in FIG. 5 is an apparatus that receives and demodulates the transmission signal TX transmitted from the transmission apparatus 100 illustrated in FIG. 1 to obtain, for example, the weather observation data (e.g., observation data including atmospheric temperature, sunshine, rainfall, wind direction, wind speed, etc.) or the like. The reception apparatus 200 is installed, for example, in an urban area near a base of a mountain or the like (e.g., in a research facility of a university or the like, or in a facility such as a data center or the like), and receives the wireless signal (i.e., a wireless signal transmitted from a location at a long distance) transmitted from the transmission apparatus 100 installed in a mountainous region or the like.

As illustrated in FIG. 5, the reception apparatus 200 includes an antenna 211, a low noise amplification unit 212, a band-pass filter (BPF) 213, a carrier oscillator unit 214, a multiplication unit 215, a 90-degree shifter 216, a multiplication unit 217, an A/D conversion unit 218, a memory 219, and a CPU 220.

The low noise amplification unit 212 receives the wireless signal (i.e., the transmission signal TX) via the antenna 211, amplifies the reception signal, and supplies the resultant to the band-pass filter 213.

The band-pass filter 213 removes unwanted frequency components from the reception signal, and supplies the resultant to each of the multiplication unit 215 and the multiplication unit 217.

The carrier oscillator unit 214 generates a signal at a carrier frequency of a predetermined frequency used in the transmission and reception. In a case where a signal transmitted using the 920 MHz band is received, for example, the carrier oscillator unit 214 generates a frequency of 920 MHz. The carrier oscillator unit 214 supplies the generated signal (i.e., a carrier signal) to each of the multiplication unit 215 and the 90-degree shifter 216.

The multiplication unit 215 multiplies the reception signal supplied from the band-pass filter 213 by the carrier signal supplied from the carrier oscillator unit 214, thus generating a baseband InPhase signal (i.e., an I signal). The multiplication unit 215 supplies the I signal to the A/D conversion unit 218.

The 90-degree shifter 216 shifts the phase of the carrier signal supplied from the carrier oscillator unit 214 by 90 degrees. The 90-degree shifter 216 supplies the phase-shifted carrier signal to the multiplication unit 217.

The multiplication unit 217 multiplies the reception signal supplied from the band-pass filter 213 by the carrier signal subjected to the 90-degree phase shift and supplied from the 90-degree shifter 216, thus generating a baseband quadrature signal (i.e., a Q signal). The multiplication unit 215 supplies the Q signal to the A/D conversion unit 218.

The A/D conversion unit 218 subjects each of the supplied I signal and the supplied Q signal to A/D conversion, and supplies the resulting digital data to the memory 219 to be stored therein. A conversion rate of the A/D conversion unit 218 needs to be more than twice a chip rate used in the transmission. In a case where the transmission is performed with a chip rate of 200 K/s and $\Delta=5$ μs, for example, the A/D conversion unit 218 needs to perform the A/D conversion at a conversion rate of at least 400 KHz or higher.

The memory 219 has a predetermined storage medium, and acquires the digital data of the I signal and the Q signal which are supplied from the A/D conversion unit 218, and stores the digital data in the storage medium. This storage medium may be any desired storage medium, and may be, for example, a semiconductor memory, a magnetic recording medium, such as a hard disk, or any of other storage media. In a case where the A/D conversion unit 218 performs the A/D conversion for 30 seconds with a precision of 16 bits and a double conversion rate (i.e., 400 KHz), digital data of the I signal and the Q signal with 48 megabytes (48 Mbytes) is stored in the memory 219.

The CPU 220 reads out the digital data of the I signal and the Q signal stored in the memory 219, and performs a decoding process thereon, thus reconstructing the weather observation data TM. The CPU 220 outputs the reconstructed weather observation data TM.

In the above-described manner, the reception apparatus 200 is able to receive and decode the transmission signal transmitted from the transmission apparatus 100. That is, the reception apparatus 200 is able to receive and accurately decode the transmission frame transmitted as a frame having a duration of 0.2 seconds or shorter, with the known synchronization pattern (SYNC) being distributed substantially evenly thereover, and thus obtain the weather observation data TM. The reception apparatus 200 is thus able to suppress the reduction in the reception sensitivity.

In other words, the reception apparatus 200 is able to accomplish transmission of a wireless signal over a longer distance while controlling an increase in power consumption of the whole apparatus. Accordingly, adoption of this reception apparatus 200 makes it easier to realize a system for transmitting the weather observation data obtained in the weather observation apparatus 31 installed, for example, at a place at which the observation of the weather data by man power is difficult, such as in a mountainous region, and at which a large-scale external power supply is not easily available, to, for example, an urban area near a base of a mountain or the like (e.g., to a research facility of a university or the like, or to a facility such as a data center or the like).

<CPU>

Figure 6:
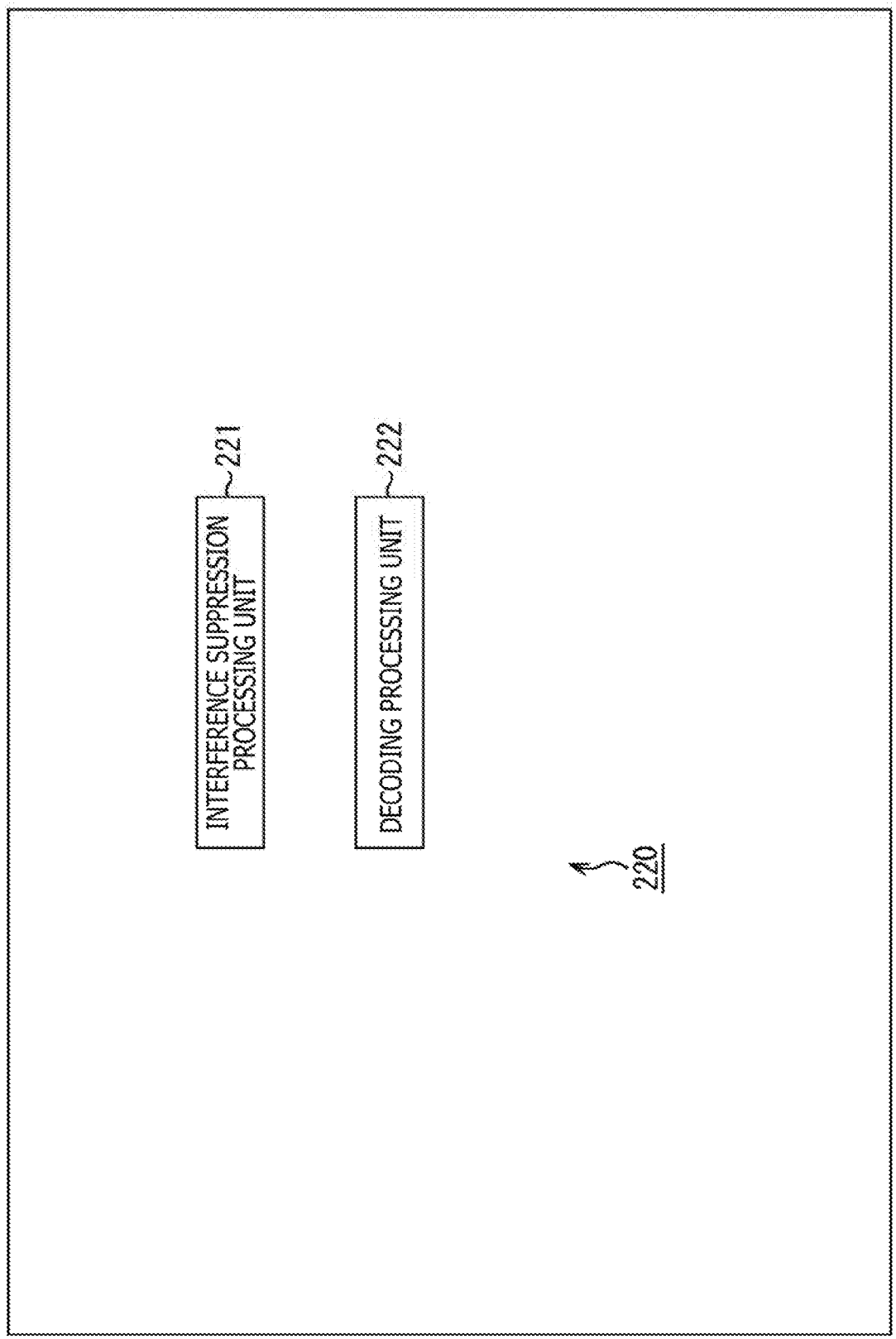
FIG. 6 is a functional block diagram illustrating examples of primary functions of a CPU.

FIG. 6 illustrates, as functional blocks, examples of primary functions of the CPU 220 which are implemented by performing processes. As illustrated in FIG. 6, the CPU 220 has an interference suppression processing unit 221 and a decoding processing unit 222 as functional blocks. The interference suppression processing unit 221 performs a process for reducing the influence (i.e., interference) of an interfering wave or the like. More specifically, the interference suppression processing unit 221 compresses the reception signal (i.e., the I signal and the Q signal read out from the memory 219) so as to have a predetermined signal level or lower. The decoding processing unit 222 performs a process related to the decoding of the transmission data (i.e., the reconstruction of the weather observation data TM) transmitted from the transmitter side, the transmission data being included in the reception signal compressed by the interference suppression processing unit 221 so as to have the predetermined signal level or lower.

<Interference Suppression Processing Unit>

Figure 7:
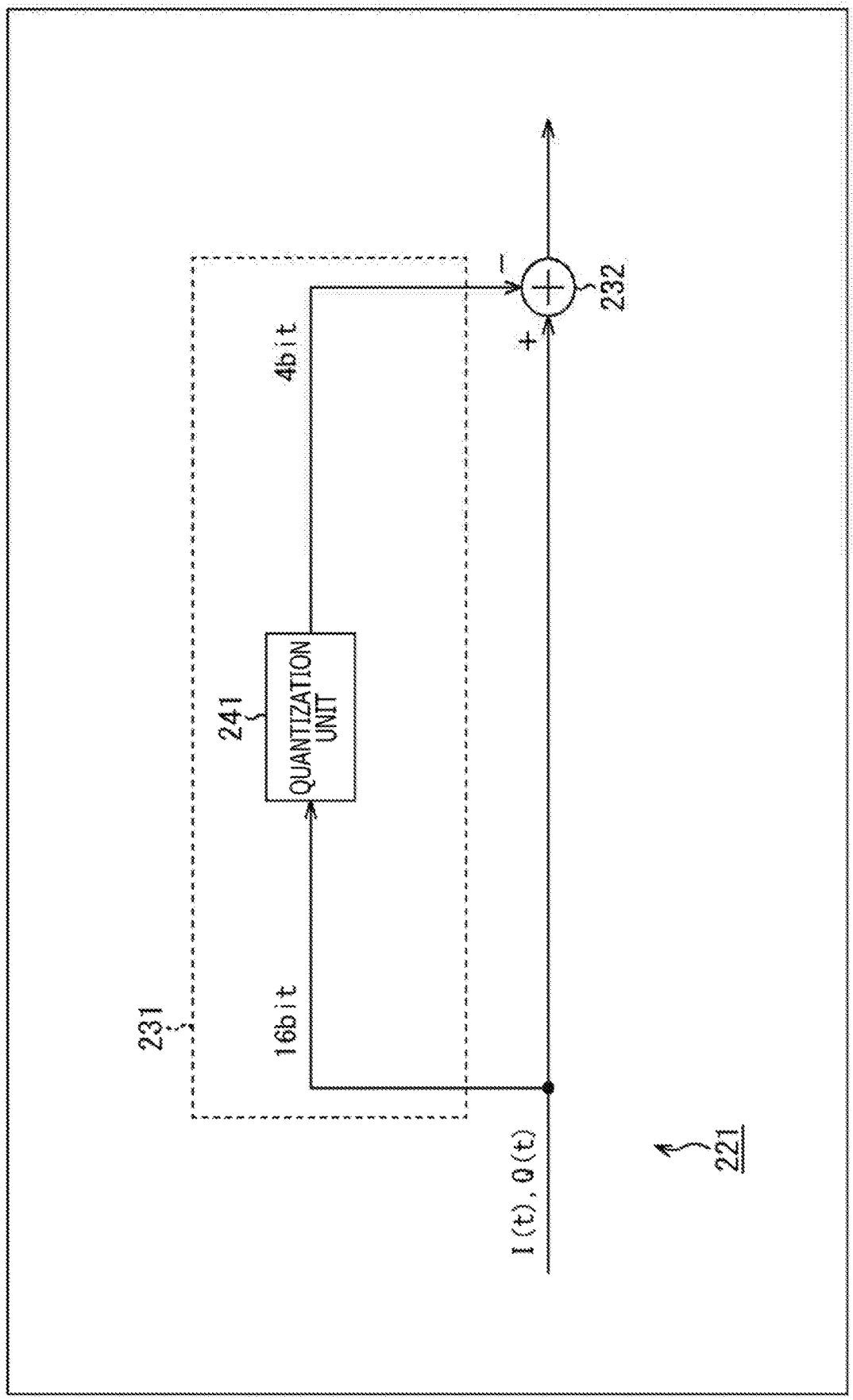
FIG. 7 is a diagram illustrating examples of primary functions of an interference suppression processing unit with an equivalent circuit.

FIG. 7 illustrates an equivalent circuit representing the process performed by the interference suppression processing unit 221. As illustrated in FIG. 7, the interference suppression processing unit 221 includes an approximate replica generation unit 231 and a computation unit 232. The approximate replica generation unit 231 generates an approximate replica signal reproducing large amplitude changes of the reception signal. The computation unit 232 subtracts the approximate replica signal generated by the approximate replica generation unit 231 from the reception signal. As a result of removal of components of the approximate replica signal, the large amplitude changes are eliminated from the reception signal, with only small amplitude changes being left. In other words, a compression in signal level is achieved.

The approximate replica generation unit 231 includes a quantization unit 241. The quantization unit 241 coarsely quantizes the reception signal. For example, the quantization unit 241 quantizes the reception signal (i.e., the I signal and the Q signal) from a bit depth of 16 bits to a bit depth of 4 bits. That is, in this case, an approximate replica signal representing the reception signal with changes of 12 lowest-order bits omitted therefrom is generated. Accordingly, the changes of the 12 lowest-order bits are extracted by the computation unit 232 subtracting the 4-bit quantized reception signal from the 16-bit reception signal. That is, the signal level of any large interfering wave is also compressed to the predetermined signal level or lower, to be substantially equal to the thermal noise level.

Accordingly, the decoding processing unit 222 is able to detect and extract the signal (i.e., the transmission data) transmitted from the transmission apparatus 100 free from the influence (i.e., interference) of a large interfering wave. The reception apparatus 200 is thus able to suppress the reduction in the reception sensitivity.

Note that the quantization performed by the quantization unit 241 may have any desired quantization step size, and that each of the reception signal and the approximate replica signal may have any desired bit depth. It may be sufficient if the signal level of the reception signal is compressed to the predetermined signal level or lower. Note that the predetermined signal level may be determined arbitrarily, and may be either equal to or different from the thermal noise level.

<Flow of Reception Process>

Next, an example flow of a reception process performed in the reception apparatus 200 as described above will now be described below with reference to a flowchart of FIG. 8.

Once the reception process is started, the low noise amplification unit 212 of the reception apparatus 200 receives the wireless signal (i.e., the transmission signal TX) via the antenna 211 at step S201.

At step S202, the low noise amplification unit 212 amplifies the reception signal, i.e., the wireless signal received at step S201.

At step S203, the band-pass filter 213 removes the unwanted frequency components from the reception signal amplified at step S202.

At step S204, the carrier oscillator unit 214 oscillates at the predetermined frequency, thus generating the carrier signal.

At step S205, the multiplication unit 215 multiplies the reception signal by the carrier signal, thus generating the I signal.

At step S206, the 90-degree shifter 216 shifts the phase of the carrier signal by 90 degrees. Then, the multiplication unit 217 multiplies the reception signal by the carrier signal subjected to the 90-degree phase shift, thus generating the Q signal.

At step S207, the A/D conversion unit 218 subjects each of the I signal generated at step S205 and the Q signal generated at step S206 to the A/D conversion.

At step S208, the memory 219 stores each of the digital data of the I signal and the digital data of the Q signal generated at step S207.

At step S209, the CPU 220 reads out the digital data of the I signal and the digital data of the Q signal from the memory 219, and performs an interference suppression process thereon, thus compressing the signal level.

At step S210, the CPU 220 performs an arithmetic decoding process on the digital data of the I signal and the digital data of the Q signal subjected to the compression in signal level at step S209, thus decoding them.

After the reception process is performed with respect to all frames, the reception process is ended.

<Flow of Interference Suppression Process>

Next, an example flow of the interference suppression process performed at step S209 in FIG. 8 will now be described below with reference to a flowchart of FIG. 9. Once the interference suppression process is started, the approximate replica generation unit 231 performs an approximate replica generation process at step S231, and thus generates the approximate replica signal reproducing the large amplitude changes of the reception signal (i.e., the I signal and the Q signal). At step S232, the computation unit 232 subtracts the approximate replica signal generated at step S231 from the reception signal (i.e., the I signal and the Q signal). After the process of step S232 is finished, the interference suppression process is ended, and control returns to FIG. 8.

<Flow of Approximate Replica Generation Process>

Figure 9:
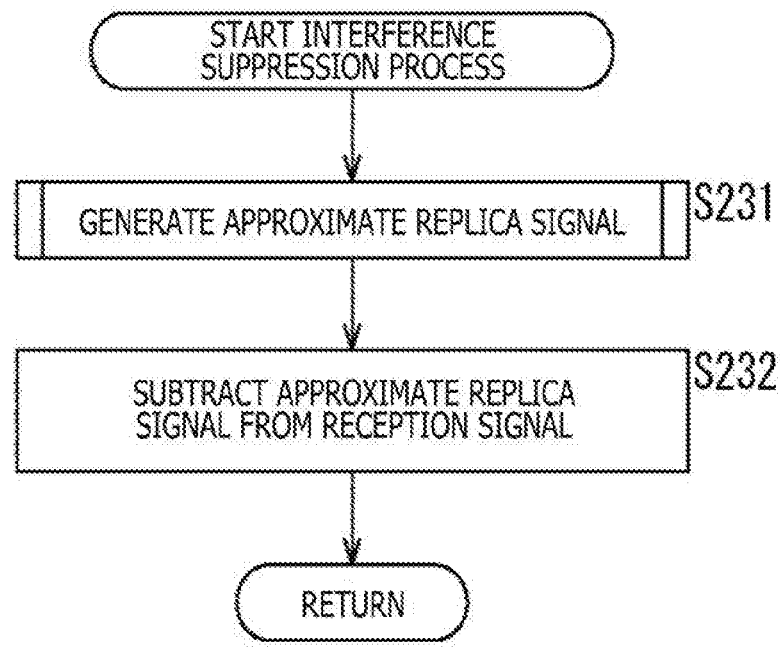
FIG. 9 is a flowchart for explaining an example flow of an interference suppression process.
Figure 10:
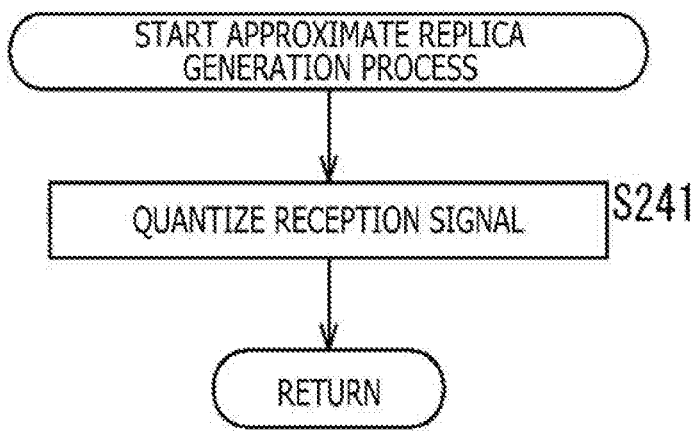
FIG. 10 is a flowchart for explaining an example flow of an approximate replica generation process.

Next, an example flow of the approximate replica generation process performed at step S231 in FIG. 9 will now be described below with reference to a flowchart of FIG. 10. Once the approximate replica generation process is started, the quantization unit 241 coarsely quantizes the reception signal (i.e., the I signal and the Q signal) at step S241. For example, the quantization unit 241 quantizes the 16-bit reception signal to 4 bits, obtaining the result of the quantization (i.e., a 4-bit signal) as the approximate replica signal. After the process of step S241 is finished, the approximate replica generation process is ended, and control returns to FIG. 9.

As a result of the interference suppression process and the approximate replica generation process being performed in the above-described manners, the signal level of the reception signal is compressed to the predetermined signal level or lower.

<Flow of Arithmetic Decoding Process>

Next, an example flow of the arithmetic decoding process performed at step S210 in FIG. 8 will now be described below with reference to a flowchart of FIG. 11.

Once the arithmetic decoding process is started, the decoding processing unit 222 of the CPU 220 corrects the carrier frequency at step S251. The oscillation frequency of the carrier oscillator unit 214 can suffer from a slight frequency drift due to ambient temperature. Accordingly, the decoding processing unit 222 measures the ambient temperature, and estimates a slight deviation in the carrier frequency, and then corrects the deviation.

For example, assuming that denotes the frequency deviation estimated from the ambient temperature, the decoding processing unit 222 performs computations of Eq. (1) and Eq. (2) below to correct the frequency drift of each of the I signal and the Q signal.

$$I'(t)=I(t)\cos(2\pi\varepsilon t)-Q(t)\sin(2\pi\varepsilon t) \quad \text{[Math. 1]}$$

$$Q'(t)=I(t)\sin(2\pi\varepsilon t)+Q(t)\cos(2\pi\varepsilon t) \quad \text{[Math. 2]}$$

In Eq. (1), I'(t) is a sample value of the corrected I signal at time t. In addition, in Eq. (2), Q'(t) is a sample value of the corrected Q signal at time t.

At step S252, the decoding processing unit 222 performs a frame start position detection process, and thus detects 100 frame start positions.

At step S253, the decoding processing unit 222 cuts out a reception signal (i.e., an I signal and a Q signal) corresponding to one frame starting from one of the frame start positions detected at step S252. Note that the number of the frame detected is denoted by n.

At step S254, the decoding processing unit 222 performs a parameter calculation process, and thus computes a value of correlation between the I and Q signals cut out at step S253 and the synchronization signal (SYNC), obtaining the computed correlation value as β(n). In addition, the decoding processing unit 222 obtains a frequency correction value γ(n) and an initial phase θ(n) that maximize the correlation value β(n).

At step S255, the decoding processing unit 222 corrects the frequency and initial phase of the reception signal using the frequency correction value γ(n) and the initial phase θ(n) calculated at step S254.

At step S256, the decoding processing unit 222 adds the reception signal corrected at step S255 to frame data. At this time, the decoding processing unit 222 assigns a weight to the reception signal to be added, using the correlation value β(n) as a weighting factor.

At step S257, the decoding processing unit 222 determines whether or not the above-described processes have been performed with respect to all the 100 frames. In a case where it is determined that there is a frame that remains to be processed, control returns to step S252, and the subsequent processes are repeated. When the processes of steps S252 to S257 have been performed with respect to all the frames, and it is determined at step S257 that all the frames have been processed, control proceeds to step S258.

At step S258, the decoding processing unit 222 multiplies the frame data obtained by the addition by a Gold code and thereafter performs additions, and thus performs despreading and the decoding process, reconstructing the weather observation data TM.

At step S259, the decoding processing unit 222 performs CRC computation to perform an error check.

At step S260, when no error is detected in the error check at step S259, the decoding processing unit 222 outputs the weather observation data TM as decoded data.

Figure 8:
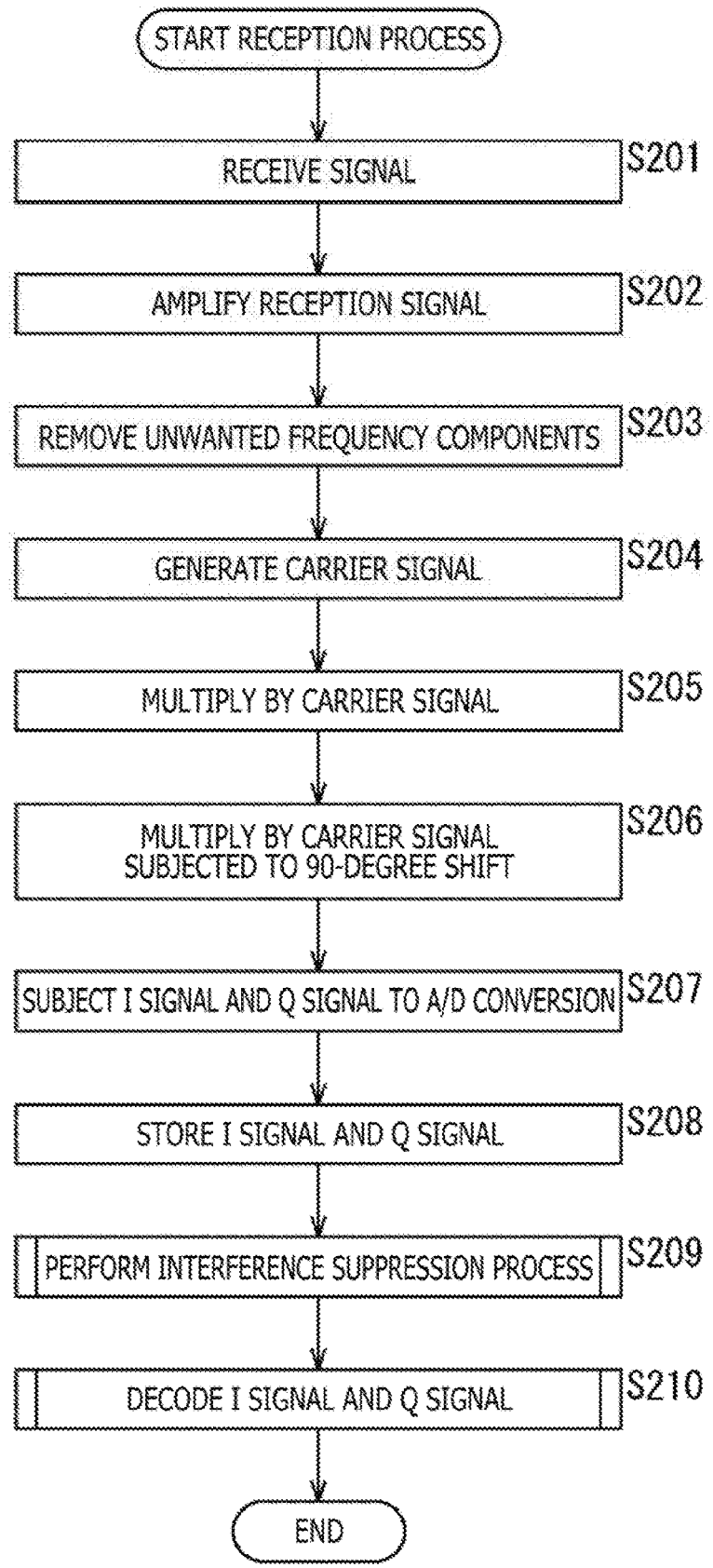
FIG. 8 is a flowchart for explaining an example flow of a reception process.

After the process of step S260 is finished, the arithmetic decoding process is ended, and control returns to FIG. 8.

<Flow of Frame Start Position Detection Process>

Next, an example flow of the frame position detection process performed at step S252 in FIG. 11 will now be described below with reference to a flowchart of FIG. 12.

Here, when the level of the reception signal is low, the signal transmitted may be buried in noise, making it impossible to detect the start position of each frame with a conventional method. Accordingly, the decoding processing unit 222 uses the known synchronization pattern (SYNC) spread over the whole frame to detect the frame start position.

Once the frame position detection process is started, the decoding processing unit 222 generates a known synchronization waveform representing the synchronization pattern (SYNC) extracted at step S271. Specifically, the decoding processing unit 222 replaces "0" and "1" of the bits corresponding to the synchronization pattern (SYNC) in the transmission data QD with "+1" and "−1," respectively. In addition, the decoding processing unit 222 causes all the bits corresponding to the UND in the transmission data QD to have zero values.

At step S272, the decoding processing unit 222 performs a multiplication by a Gold code, and thus generates a known spreading code ref(t, n).

At step S273, the decoding processing unit 222 subjects the known spreading code ref(t, n) to fast Fourier transform (FFT) to obtain R(k, n).

At step S274, the decoding processing unit 222 subjects the I signal and the Q signal (i.e., I' (t) and Q' (t)) to fast Fourier transform to obtain a complex reception signal spectrum S(k). Here, each of R(k) and S(k) is a complex spectrum.

At step S275, the decoding processing unit 222 sets an infinitesimal shift ζ in frequency, and calculates a cross-correlation value c(t, ζ) with a multiplication of the complex spectrum. This cross-correlation value is obtained using inverse fast Fourier transform (IFFT) expressed as Eq. (3) below.

$$c(t,\zeta)=\text{IFFT}\{R(k\text{-}\zeta)\cdot S^*(k)\} \quad \text{[Math. 3]}$$

Note that S*(k) is a complex conjugate component of S(k).

Here, computation of the frequency shift requires the computations described above with reference to Eq. (1) and Eq. (2), resulting in a very long time required for the computation. However, use of the FFT and the IFFT allows the computation of the frequency shift to be substituted with readout position shifting for an array. Therefore, the computation of Eq. (3) is fast. In addition, S(k) is a signal that has passed through a band-pass filter. Therefore, the multiplication (R(k-ζ) and S*(k)) in Eq. (3) produces a zero result for frequencies outside of a predetermined limited frequency range. Therefore, the computation of Eq. (3) can be performed at a high speed.

As described above, the use of the fast Fourier transform (FFT) and the inverse fast Fourier transform (IFFT) enables the decoding processing unit 222 to perform the correlation computation at a higher speed.

The infinitesimal shift ζ in frequency can vary depending on the frame start position. Thus, at step S276, the decoding processing unit 222 calculates a cross-correlation value α(t) at time t by summing up the absolute value of c(t, ζ) while successively shifting the value of the infinitesimal shift ζ as expressed by Eq. (4) below.

$$\alpha(t)=\Sigma_{\zeta=-\gamma}^{+\gamma}|c(t,\zeta)|^2 \quad \text{[Math. 4]}$$

Figure 13:
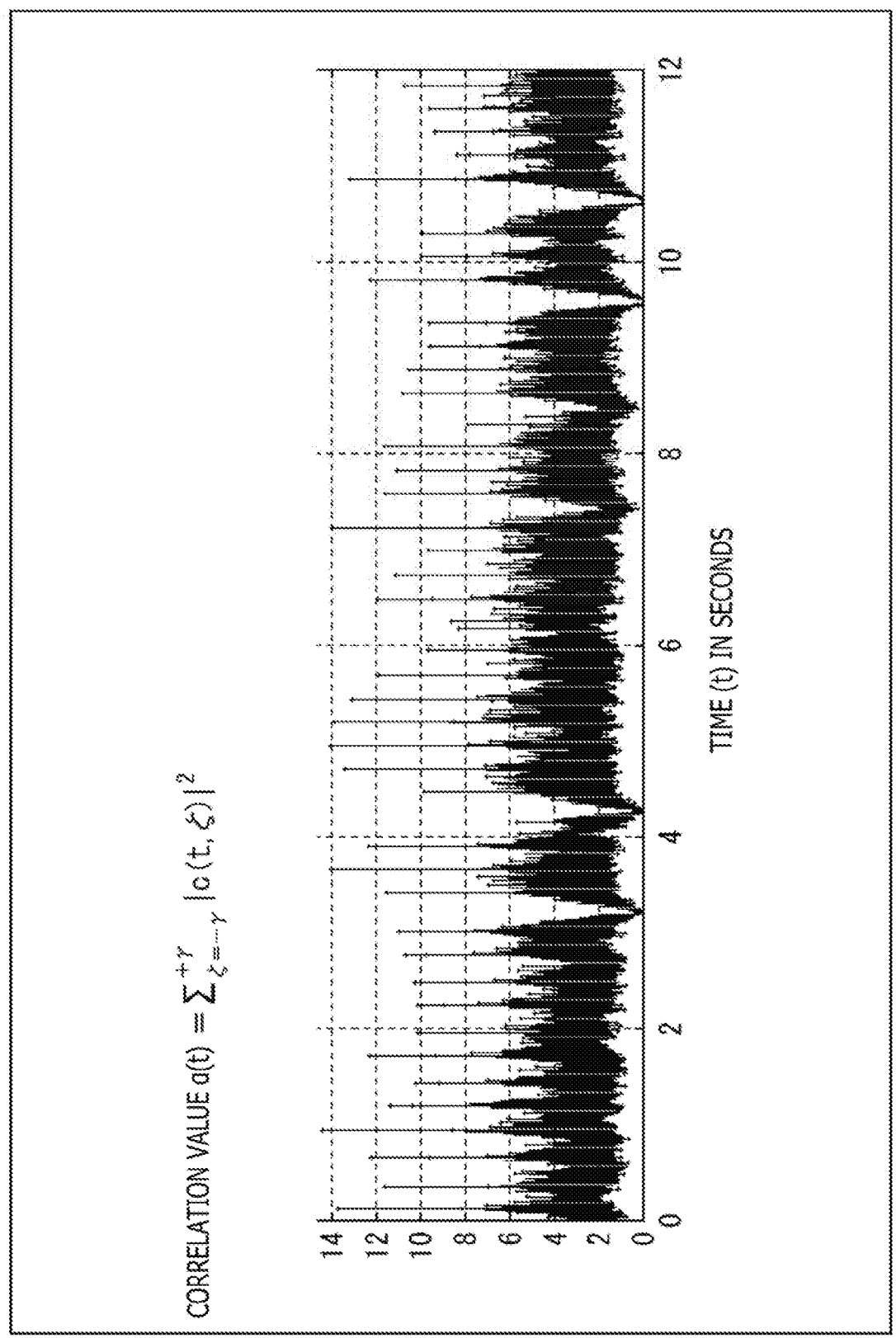
FIG. 13 is a diagram illustrating example plots of a cross-correlation value $\alpha(t)$.

FIG. 13 is a diagram illustrating example plots of α(t) obtained by the above computation. It can be seen that peaks occur substantially periodically (every 0.3 seconds) in a plotting period of 12 seconds. These peak positions specifically correspond to the start positions of frames. It can also be seen that the values of the peaks are not constant, and greatly vary at different times. This variation can be ascribed to various factors, including fading and phase rotations in the carrier oscillators in the transmitter and the receiver.

The example plots in FIG. 13 represent example plots that are obtained in a condition in which the SNR is relatively good, and allow easy identification of the peak positions of α(t). However, in a condition in which the field strength for the communication is low, for example, the amplitude of α(t) may be reduced to be buried in noise, making clear finding of the peak positions as in the example of FIG. 13 difficult.

At step S277, the decoding processing unit 222 performs a peak detection process, and finds peaks of the cross-correlation value α(t), and thus detects the frame start positions. It is assumed here that the cross-correlation value for an nth frame is denoted by β(n). Assuming that tn denotes a time at which α(t) is at a peak, a relation between α(t) and β(n) is expressed by Eq. (5) below.

$$\beta(n)=\alpha(tn) \qquad [\text{Math. 5}]$$

Figure 14:
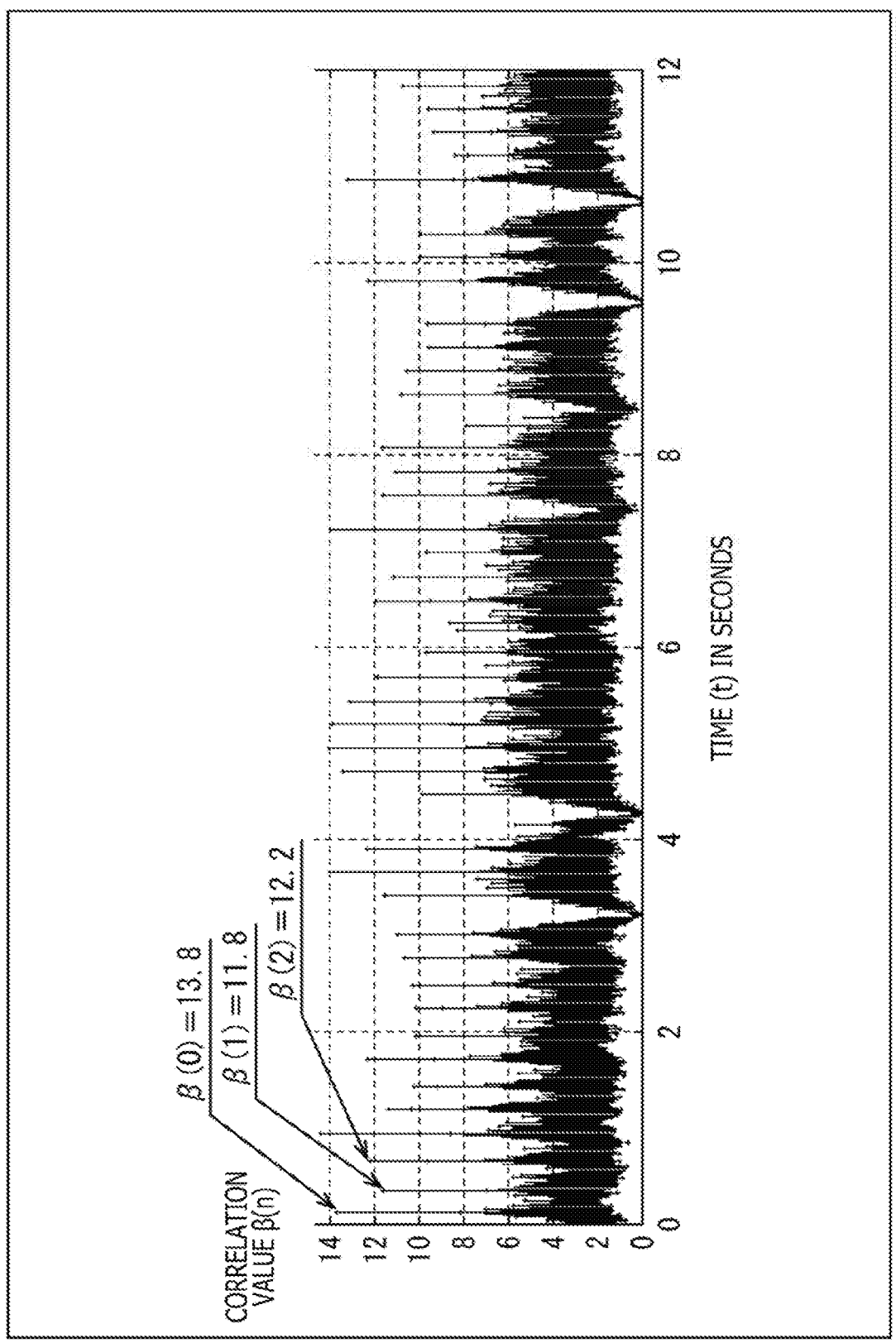
FIG. 14 is a diagram of a cross-correlation value $\beta(n)$.

FIG. 14 is a diagram illustrating example plots of β(n) obtained by the above computation. In the example of FIG. 14, the frame start positions are found approximately every 0.3 seconds. In addition, peaks are lacking (i.e., frame start positions are not found) at some places due to an electric wave condition.

Figure 11:
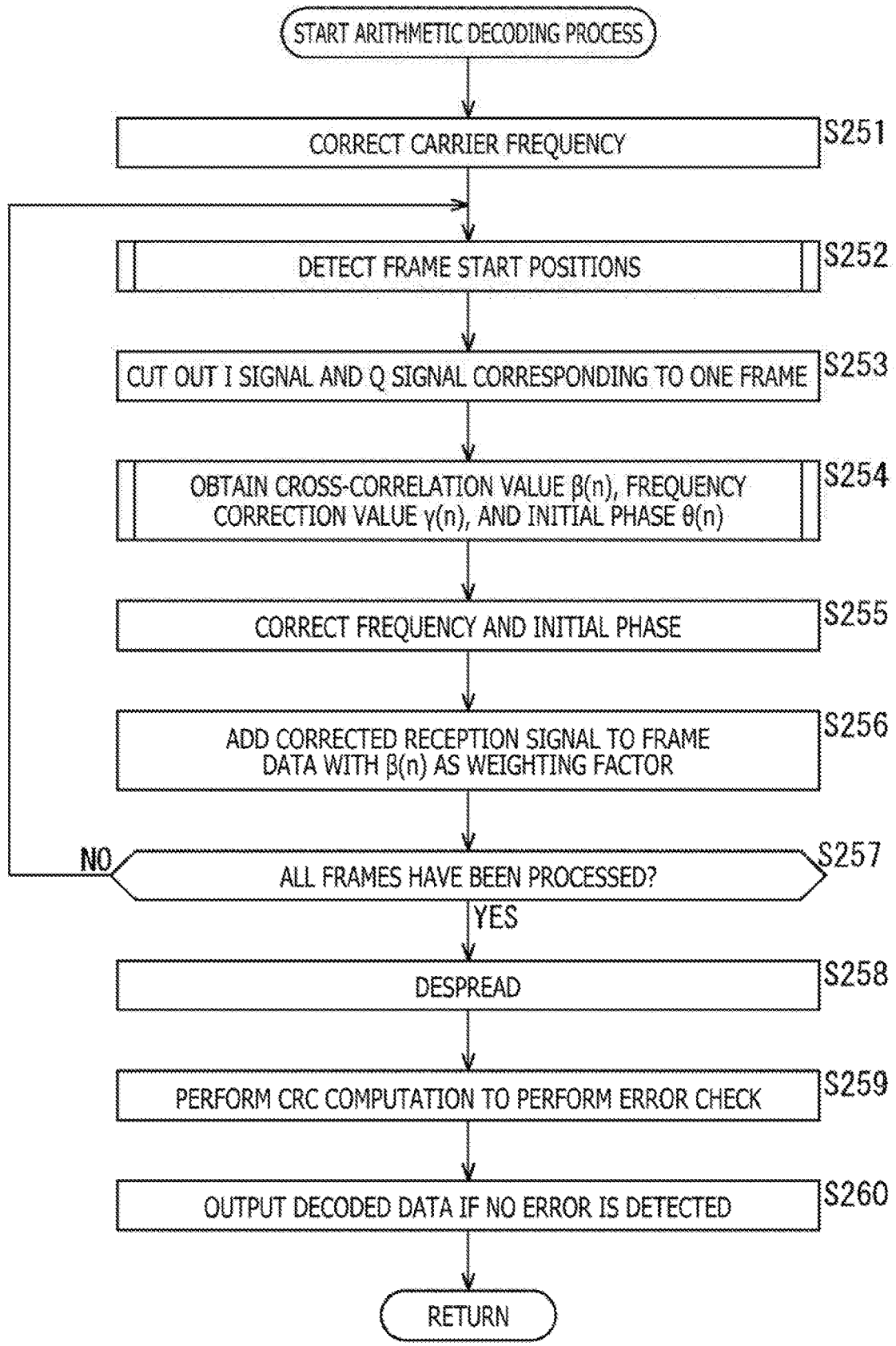
FIG. 11 is a flowchart for explaining an example flow of an arithmetic decoding process.

After the process of step S277 is finished, the frame start position detection process is ended, and control returns to FIG. 11.

<Flow of Peak Detection Process>

Figure 15:
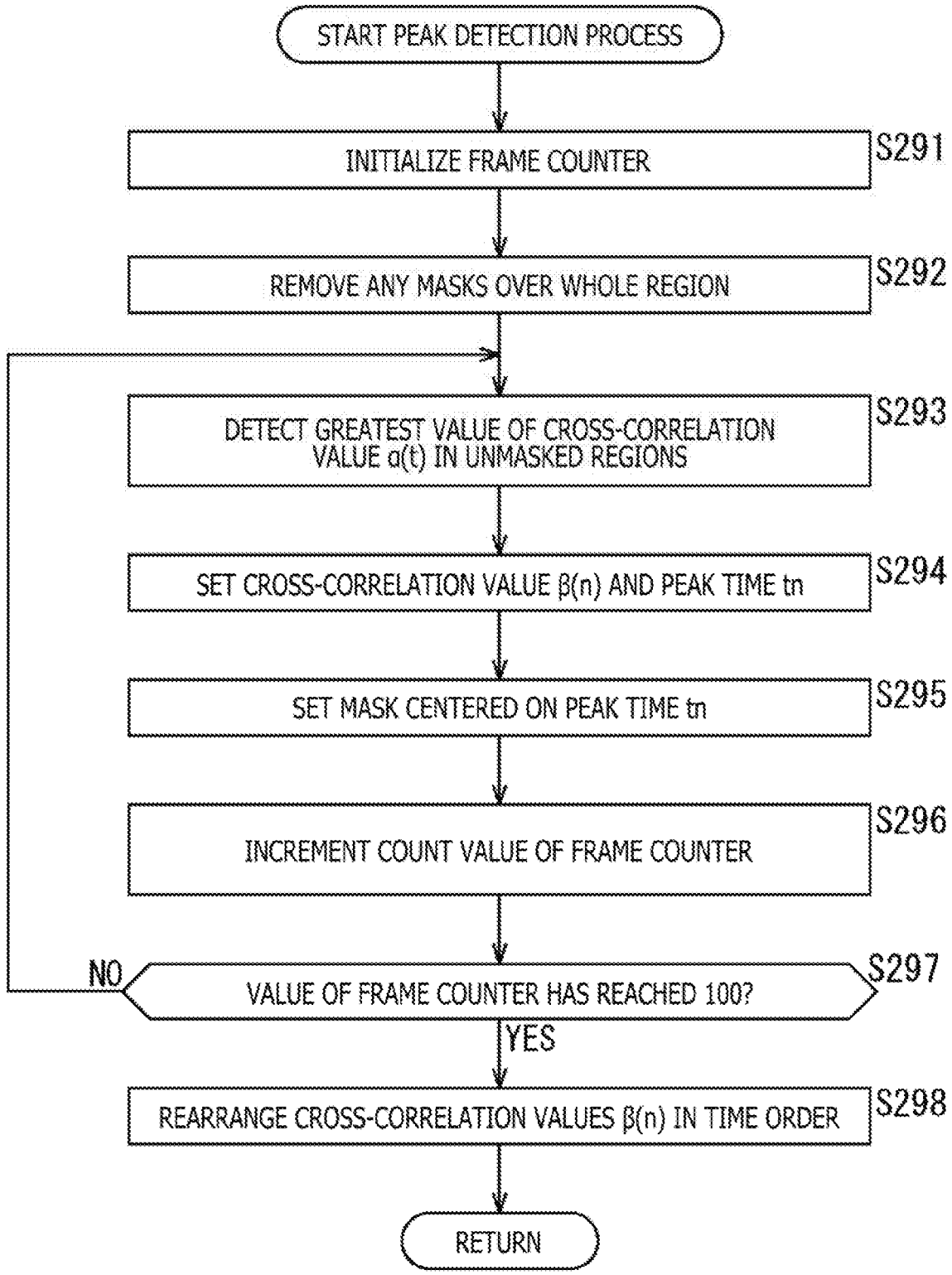
FIG. 15 is a flowchart for explaining an example flow of a peak detection process.

Next, with reference to a flowchart of FIG. 15, an example flow of the peak detection process performed at step S277 in FIG. 12 will now be described below.

Once the peak detection process is started, the decoding processing unit 222 initializes the value of a frame counter n to zero at step S291.

At step S292, the decoding processing unit 222 removes any masks over the whole region of 30 seconds. A masked region includes a time region that is excluded for peak detection described below.

Figure 16:
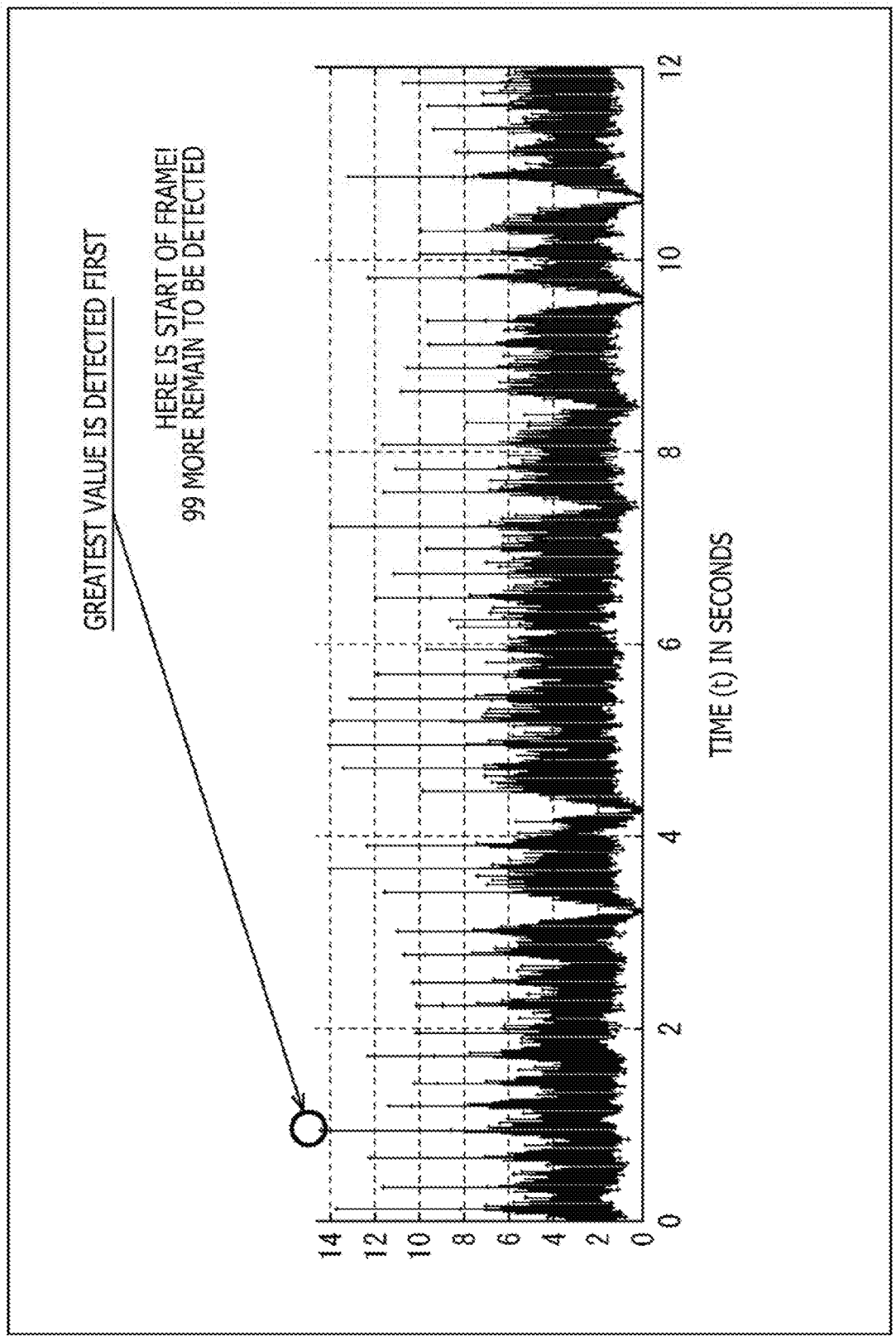
FIG. 16 is a diagram for explaining how peak detection is performed.

At step S293, the decoding processing unit 222 detects the greatest value of the cross-correlation value α(t) in all time regions in which no mask is set. FIG. 16 illustrates an example of how such a detection is made. A time at which the cross-correlation value α(t) becomes the greatest is a time that can be considered to correspond to the start of a frame.

Accordingly, at step S294, the decoding processing unit 222 stores this time as tn. In addition, the decoding processing unit 222 stores the peak of the correlation value as β(n)=α(tn). That is, the decoding processing unit 222 sets the cross-correlation value β(n) and the peak time tn.

When the position of the peak detected corresponds to the start of a frame, that means that another frame is not present in a period of 0.2 seconds before and after that position.

Figure 17:
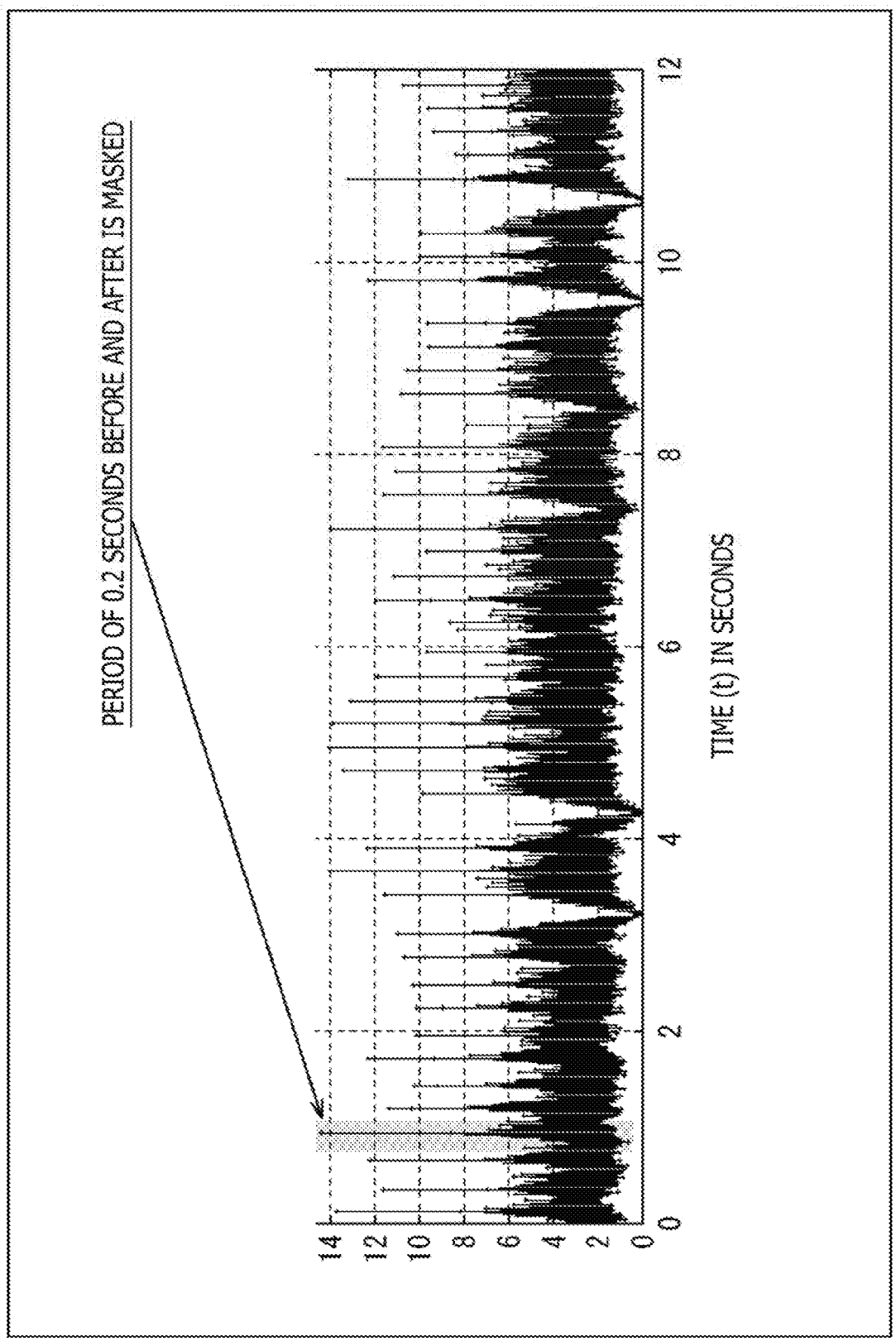
FIG. 17 is a diagram for explaining how peak detection is performed.
Figure 18:
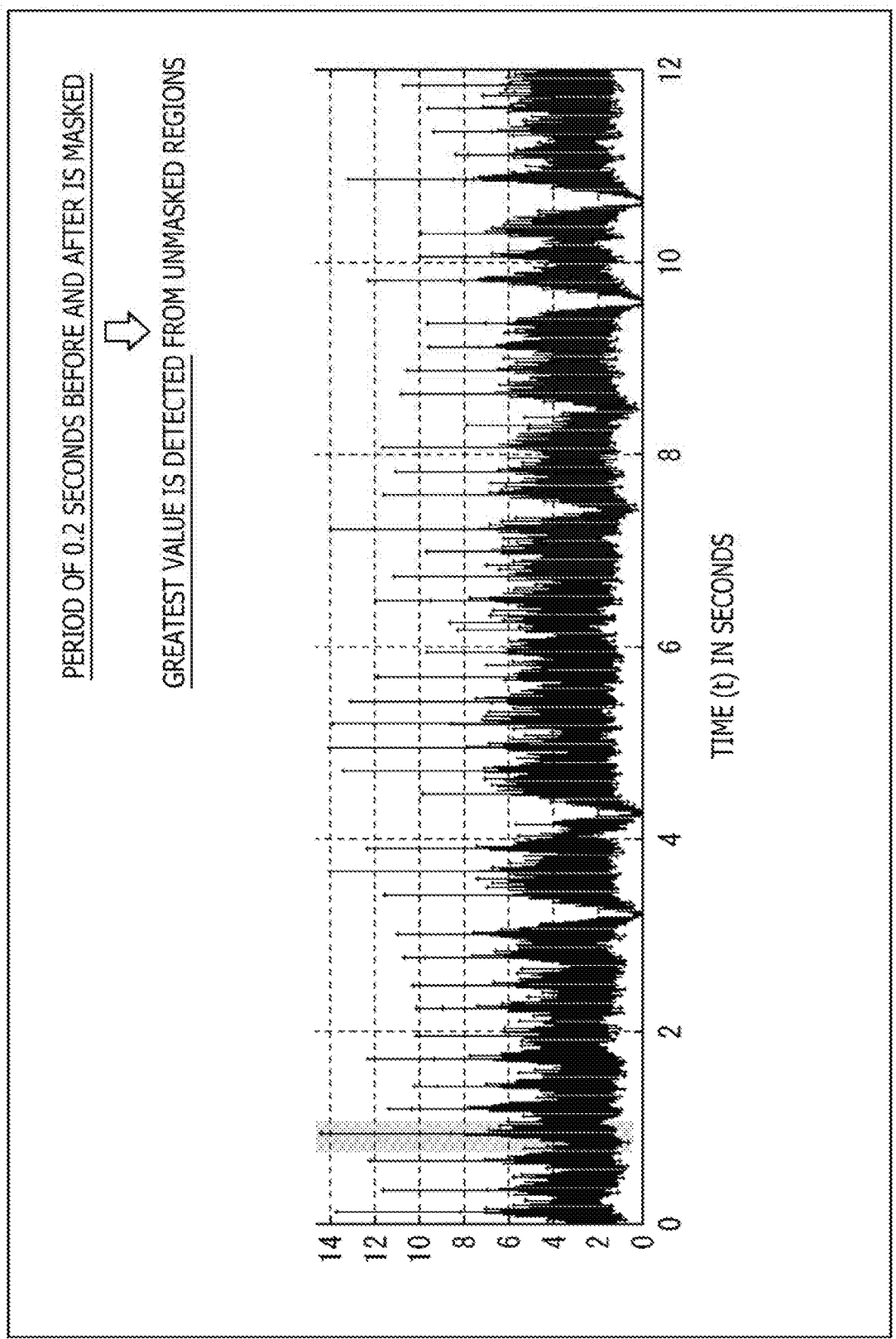
FIG. 18 is a diagram for explaining how peak detection is performed.
Figure 19:
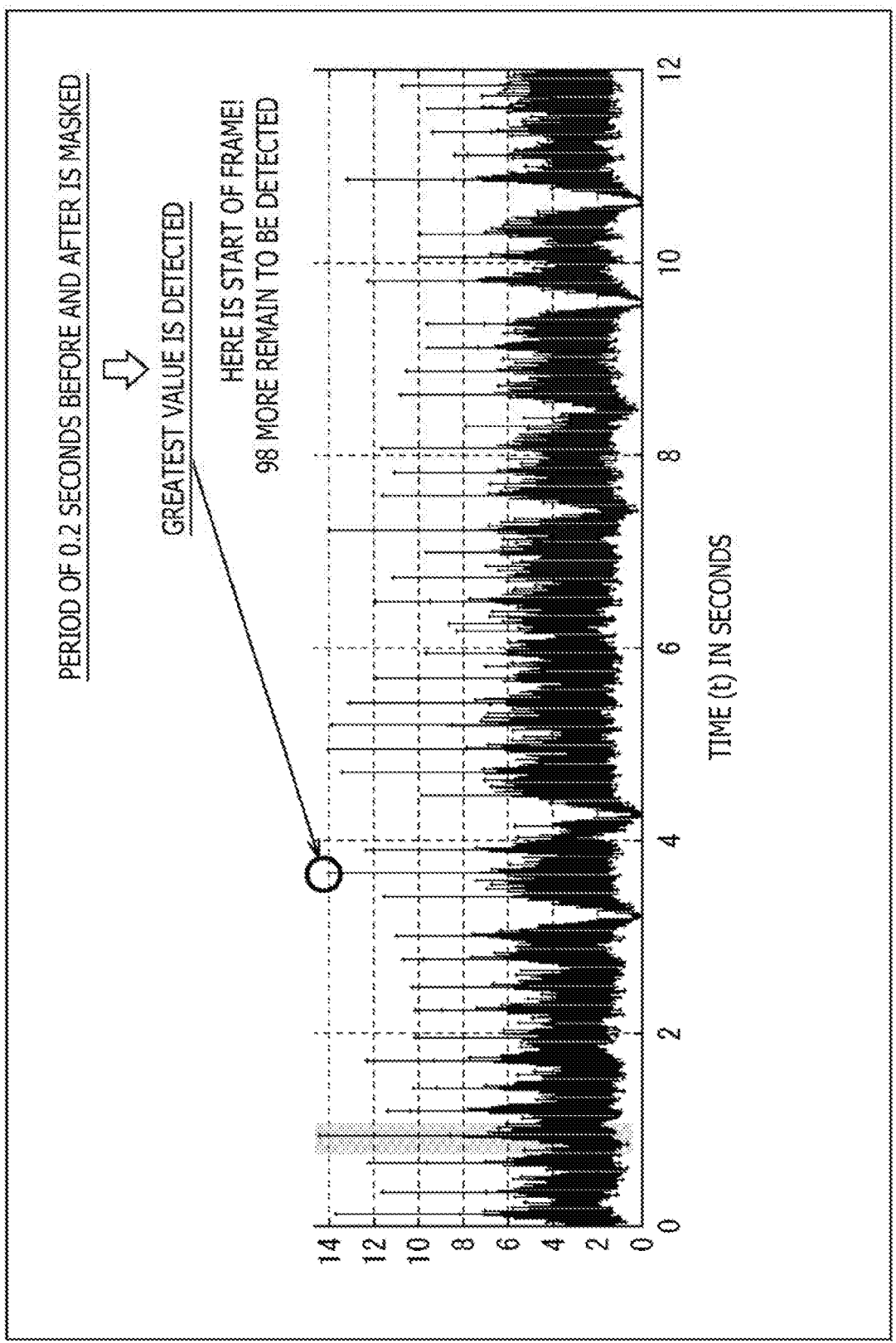
FIG. 19 is a diagram for explaining how peak detection is performed.
Figure 20:
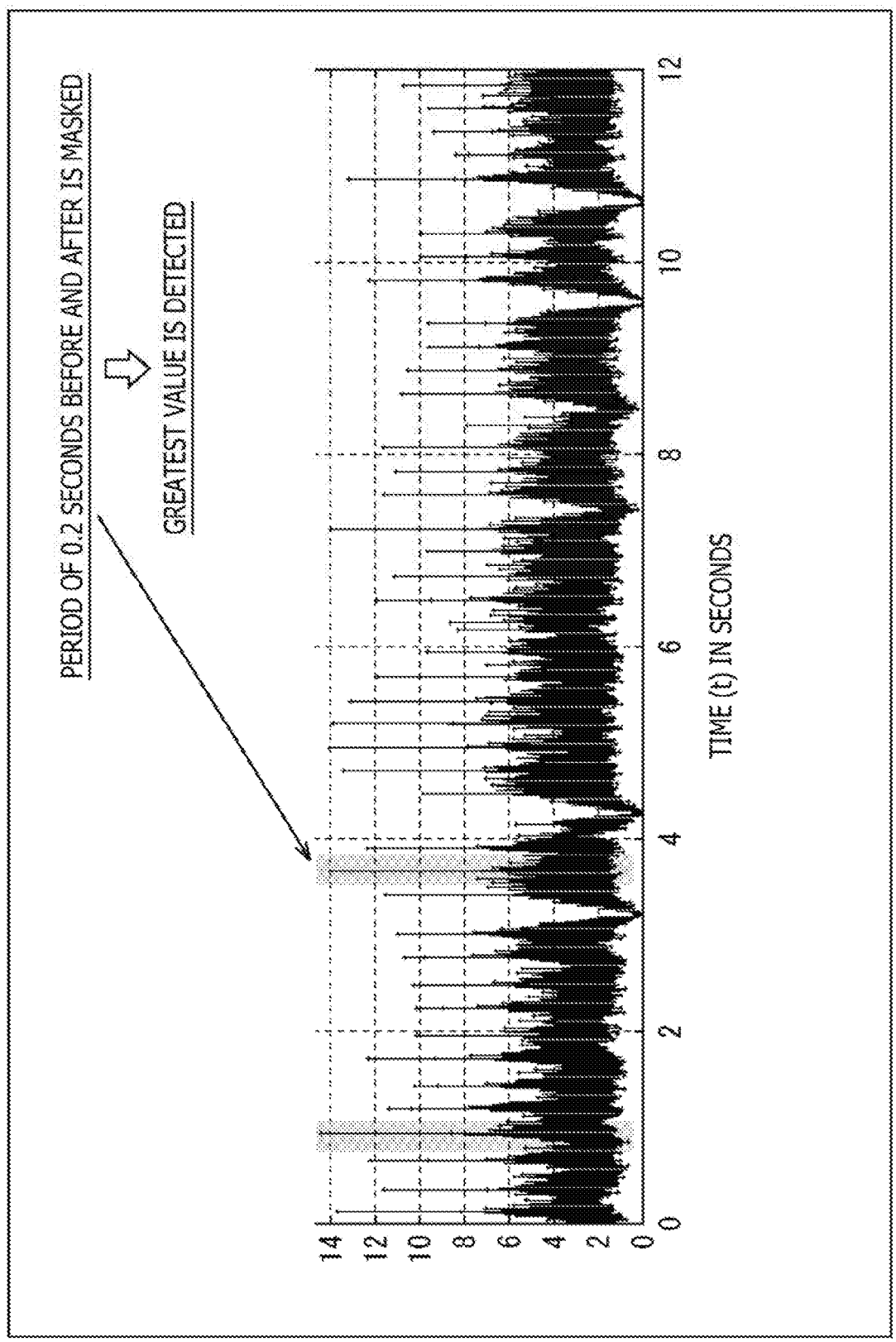
FIG. 20 is a diagram for explaining how peak detection is performed.
Figure 21:
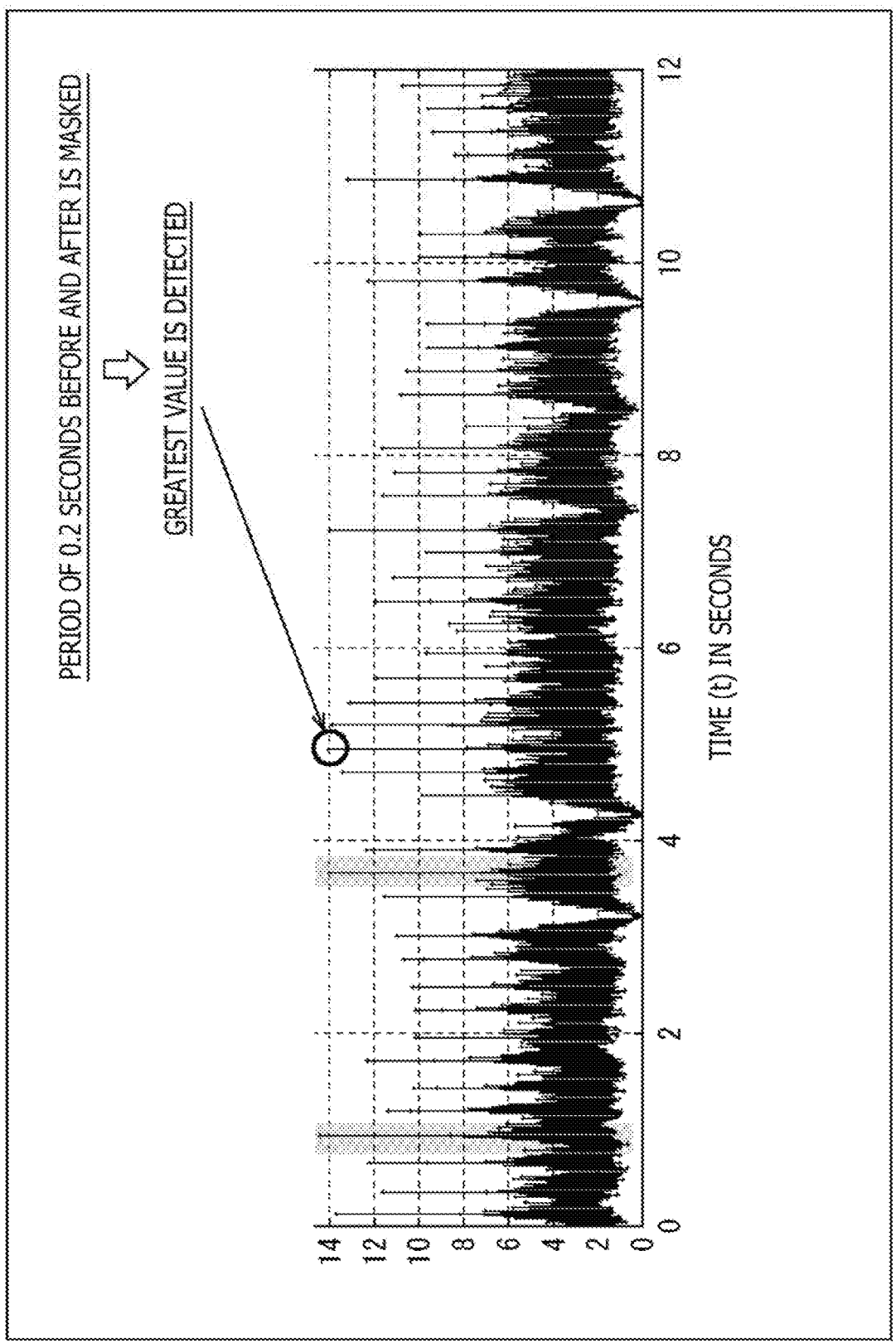
FIG. 21 is a diagram for explaining how peak detection is performed.

Accordingly, at step S295, the decoding processing unit 222 sets a mask over the period of 0.2 seconds before and after the peak detected at step S293. FIG. 17 illustrates an example of how the mask is set.

Next, at step S296, the decoding processing unit 222 updates the value of the frame counter n by adding "1" to the value thereof.

At step S297, the decoding processing unit 222 determines whether or not the value of the frame counter has reached "100." That is, the decoding processing unit 222 determines whether or not detection of all the frames that are expected has been finished.

In a case where it is determined that the count value has not reached 100, and that the detection of all the frames that are expected has not been finished, control returns to step S293, and the subsequent processes are repeated. That is, a detection of the greatest value as described above is performed again. Note that, in this case, a mask has been set by the process of step S295 in each time region around which the start of a frame had already been found. Accordingly, the decoding processing unit 222 performs the detection of the greatest value while avoiding the mask(s) already set as illustrated in FIGS. 18 to 21.

The detection of the greatest value is repeatedly performed in the above-described manner, and when it is determined at step S297 that a predetermined number (e.g., 100) of peaks have been found, control proceeds to step S298.

As a result of the above-described processes, values stored in β(n) are arranged in descending order of the peaks of α(tn). Accordingly, at step S298, the decoding processing unit 222 rearranges the values of β(n) in an order in which the peaks have occurred.

Figure 12:
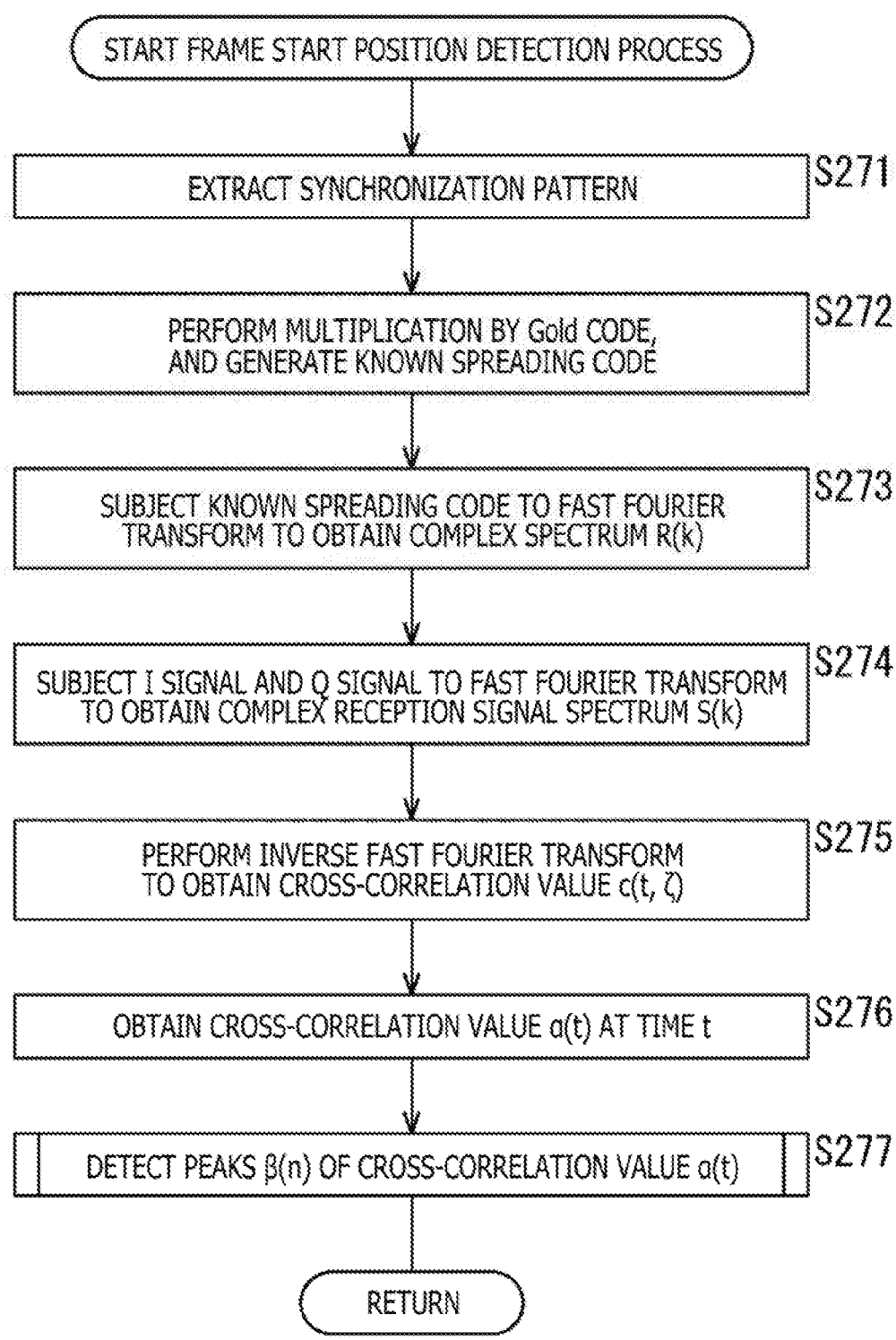
FIG. 12 is a flowchart for explaining an example flow of a frame start position detection process.

After the process of step S298 is finished, the peak detection process is ended, and control returns to FIG. 12.

As described above, the frame start positions are found in descending order of the peaks, and thus, the decoding processing unit 222 is able to find the frame start positions with increased accuracy even when the SNR is low.

<Flow of Parameter Calculation Process>

Figure 22:
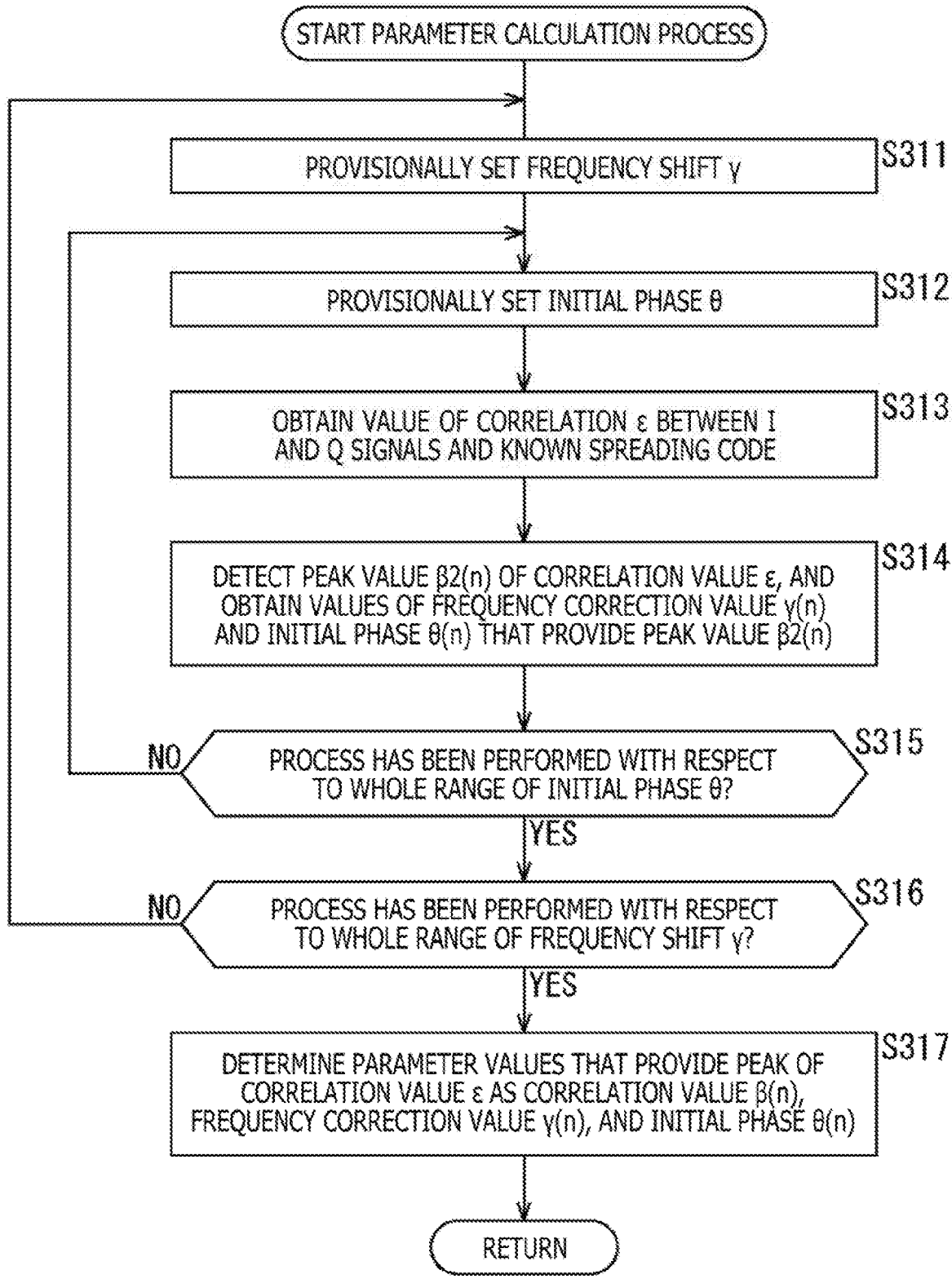
FIG. 22 is a flowchart for explaining an example flow of a parameter calculation process.

Next, with reference to a flowchart of FIG. 22, an example flow of the parameter calculation process performed at step S254 in FIG. 11 will now be described below.

Once the parameter calculation process is started, the decoding processing unit 222 provisionally sets the value of the frequency shift γ(n) for the I signal and the Q signal cut out for each frame at step S311. For example, the decoding processing unit 222 sets, as the provisionally set value of γ, a value in the range of −50 Hz to +50 Hz in steps of 5 Hz.

At step S312, the decoding processing unit 222 provisionally sets the value of the initial phase θ(n). For example, the decoding processing unit 222 sets, as the provisionally set value of θ, a value in the range of −180 degrees to +160 degrees by 20 degrees.

At step S313, the decoding processing unit 222 computes the value of correlation ε(γ, θ) between the I and Q signals cut out and the known spreading code ref(t, n), corresponding to only the synchronization part, on the basis of the provisional frequency shift γ set at step S311 and the provisional initial phase θ set at step S312.

At step S314, the decoding processing unit 222 obtains a peak value of the correlation value ε(γ, θ) as β2(n). In addition, the decoding processing unit 222 obtains values of γ and θ that provide the peak of the correlation value ε(γ, θ) as the frequency correction value γ(n) and the initial phase θ(n), respectively.

At step S315, the decoding processing unit 222 determines whether or not the process has been performed with respect to the whole range of the initial phase θ. In a case where it is determined that there is a range with respect to which the process has not been performed, control returns to step S312, and the subsequent processes are repeated. In a case where the processes of steps S312 to S315 are repeatedly performed, and it is determined at step S315 that the process has been performed with respect to the whole range of the initial phase θ, control proceeds to step S316.

At step S316, the decoding processing unit 222 determines whether or not the process has been performed with respect to the whole range of the frequency shift γ. In a case where it is determined that there is a range with respect to which the process has not been performed, control returns to step S311, and the subsequent processes are repeated. In a case where the processes of steps S311 to S316 are repeatedly performed, and it is determined at step S316 that the process has been performed with respect to the whole range of the frequency shift γ, control proceeds to step S317.

At step S317, the decoding processing unit 222 determines the parameter values that provide the peak of the correlation value ε as the correlation value β(n), the frequency correction value γ(n), and the initial phase θ(n).

After the process of step S317 is finished, the parameter calculation process is ended, and control returns to FIG. 11.

The three values, β2(n), γ(n), and θ(n), obtained by the above-described processes are values that provide the greatest value of correlation between the signals and the known spreading code ref(t, n).

Figure 23:
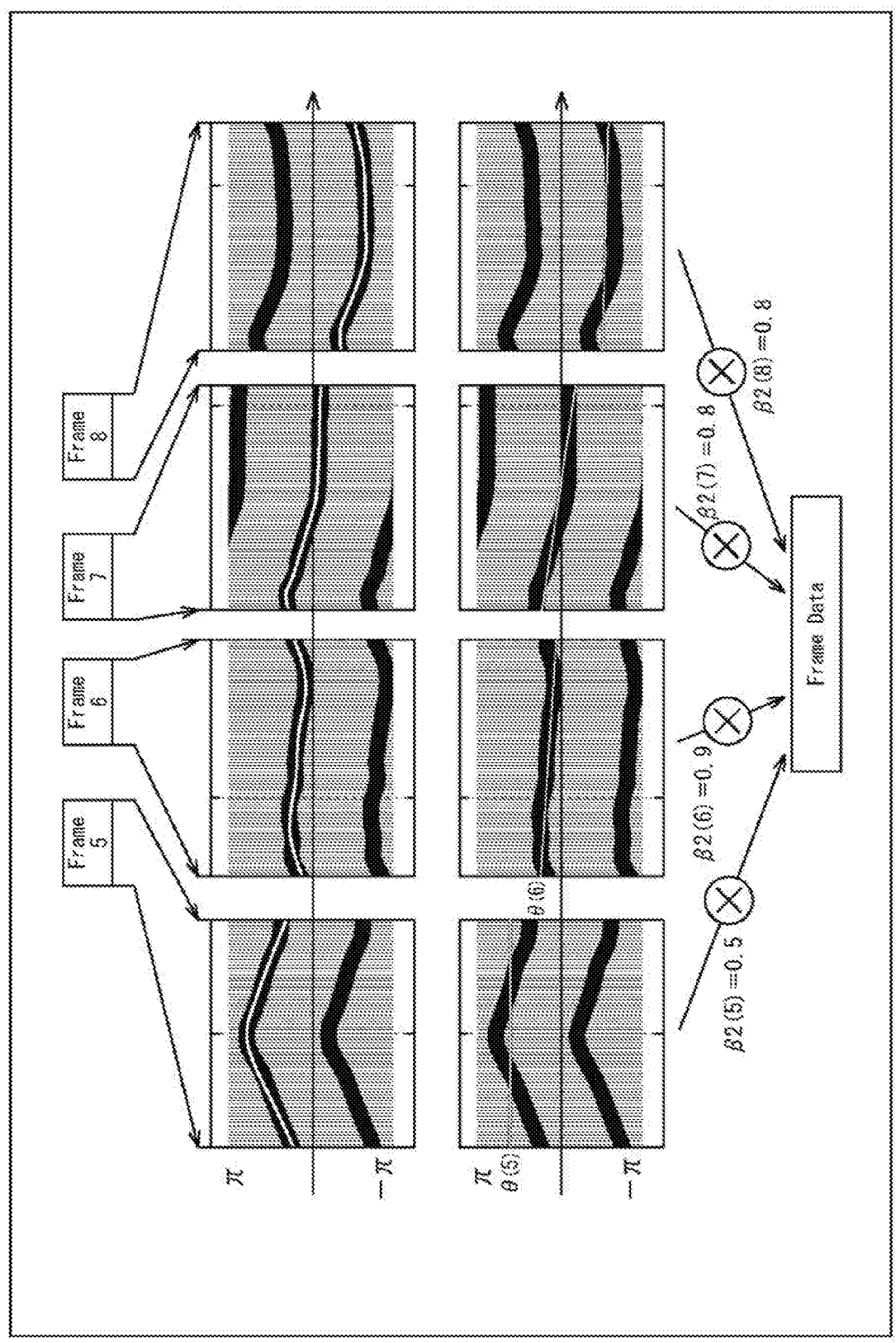
FIG. 23 is a diagram for explaining an example of approximation of a phase fluctuation.

Graphs on the upper side in FIG. 23 illustrate example phase changes in frames of 0.2 seconds obtained by experimental observations. In FIG. 23, frames 5 to 8 are extracted and shown, and slight changes in both phase and frequency can be observed therebetween. The CPU 220 is able to obtain, by performing the parameter calculation process as described above, straight lines that most closely approximate the phase changes as illustrated in graphs on the lower side in FIG. 23 for the fluctuating phase.

In the graphs on the lower side in FIG. 23, the slope of each straight line corresponds to γ(n), and the initial phase corresponds to θ(n). In addition, the correlation value β2(n) varies in accordance with a correlation between the phase fluctuation and the approximate straight line.

The processes of the above-described steps may be performed in any desired order, and may be performed in parallel, and also may be performed repeatedly as necessary.

As described above, adoption of the transmission apparatus 100 and the reception apparatus 200 enables a short time to be set as the maximum continuous transmission time. For example, when the maximum continuous transmission time is set to 0.2 seconds in the 920 MHz band, the frequency channel can be chosen from among many frequency channels for the transmission, resulting in a construction of a transmission/reception system with increased resistance to interference. In addition, performing additions of a large number of short-time frames enables an improvement in effective SNR without a limit of the maximum transmission time decided in the Radio Law being exceeded. At this time, because the synchronization signal is spread over the whole frame, even in a case where a phase fluctuation has occurred within the frame, phase and frequency corrections can be accomplished more appropriately. As a result, even a reception signal that is buried in noise and which is so weak that it is difficult to decode the reception signal by a conventional method, for example, can be decoded by the reception apparatus 200 with increased accuracy.

In addition, when the additions of the plurality of frames are performed, the multiplication by the correlation coefficient β(n) as the weighting factor is performed for the additions, and therefore, the reception apparatus 200 is able to accomplish more accurate decoding of the data because, even in such cases as when some of the frames are lacking, when a significant phase fluctuation has occurred in some of the frames, or when an error has occurred in detecting some of the frames, a reduction in the value of the correlation coefficient β(n) reduces the influence thereof.

Figure 24:
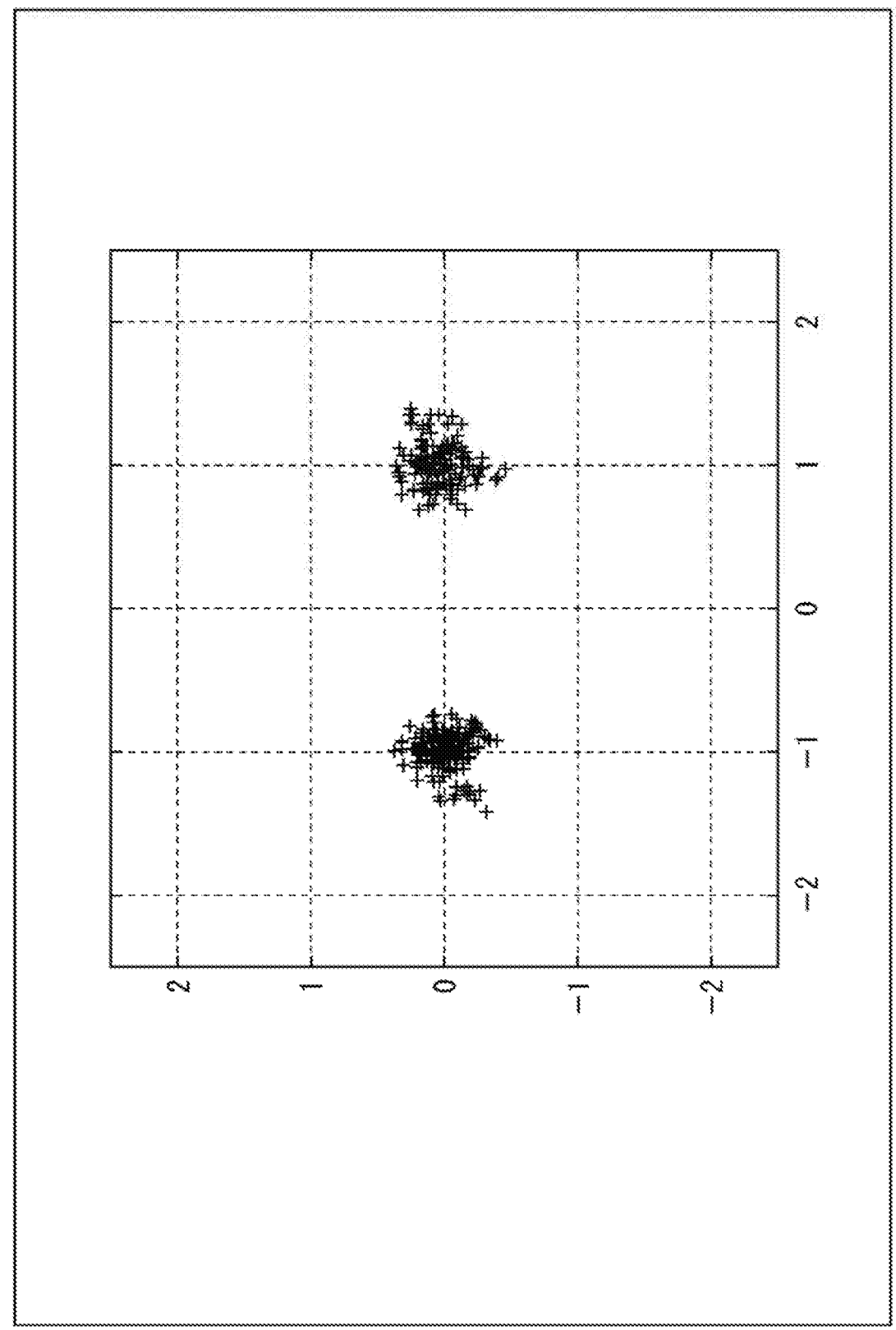
FIG. 24 is a diagram illustrating a result of decoding.

FIG. 24 illustrates a constellation of decoding results when the transmission apparatus 100 and the reception apparatus 200 to which the present technology has been applied are used for the transmission and reception. As illustrated in FIG. 24, two points are separated according to the BPSK modulation, and this demonstrates proper decoding of the data.

By performing the processes as described above, the decoding processing unit 222 is able to detect the reception signal with increased accuracy and decode the reception signal more accurately even when the reception signal is buried in noise and is so weak that it is difficult to decode the reception signal by a conventional method. Thus, an improvement in the reception sensitivity is achieved to enable wireless communication over a longer distance. At this time, the decoding processing unit 222 is able to detect and extract the signal (i.e., the transmission data) transmitted from the transmission apparatus 100 free from the influence (i.e., interference) of a large interfering wave because the signal level of the reception signal has been compressed to the predetermined signal level or lower as a result of the interference suppression process and the approximate replica generation process being performed by the interference suppression processing unit 221 as described above. The reception apparatus 200 is thus able to suppress the reduction in the reception sensitivity.

4. Second Embodiment

<Interference Suppression Processing Unit>

Figure 25:
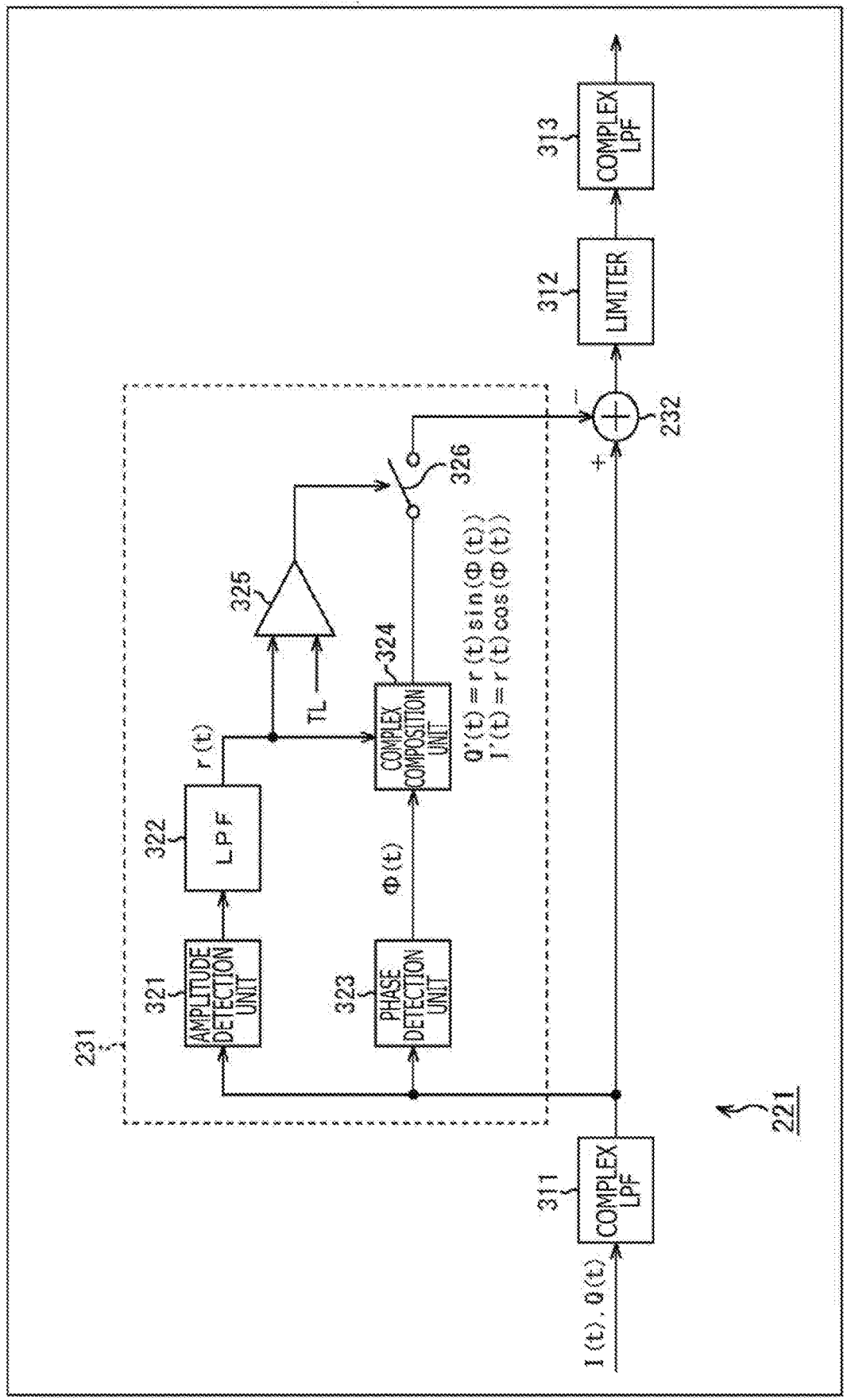
FIG. 25 is a diagram illustrating examples of primary functions of an interference suppression processing unit with an equivalent circuit.

Note that a configuration of the interference suppression processing unit 221 may be modified as desired, and is not limited to the example illustrated in FIG. 7. FIG. 25 illustrates another example of an equivalent circuit representing a process performed by the interference suppression processing unit 221. In the example illustrated in FIG. 25, the interference suppression processing unit 221 includes, in addition to an approximate replica generation unit 231 and a computation unit 232, a complex low-pass filter (complex LPF 116 KHz) 311, a limiter (±1.5 TL) 312, and a complex low-pass filter (complex LPF 50.8 KHz) 313.

The complex low-pass filter 311 is a filter for subjecting a reception signal to band limiting such that interfering waves outside of a reception channel are eliminated. This complex low-pass filter 311 is designed to eliminate components that are obviously not related to a signal transmitted from the transmission apparatus 100, and is therefore configured to subject the reception signal to band limiting so as to allow a relatively wide band to pass therethrough. An output of the complex low-pass filter 311 is supplied to each of the approximate replica generation unit 231 and the computation unit 232.

In this case, the approximate replica generation unit 231 generates an approximate replica signal for the reception signal that has passed through the complex low-pass filter 311 (i.e., the reception signal subjected to the band limiting to a certain degree). In addition, the approximate replica generation unit 231 in this case generates an approximate replica signal for a portion of the reception signal which exceeds a predetermined signal level.

As illustrated in FIG. 25, the approximate replica generation unit 231 includes an amplitude detection unit 321, a low-pass filter (LPF) 322, a phase detection unit 323, a complex composition unit 324, a comparator 325, and a switch 326.

The amplitude detection unit 321 detects the amplitude of the reception signal. More specifically, the amplitude detection unit 321 calculates the square root of the sum of the squares of the I signal and the Q signal (i.e., $\mathrm{Sqrt}(I^2+Q^2)$). The low-pass filter 322 subjects the result of the amplitude detection by the amplitude detection unit 321 to band limiting such that high-frequency components are removed therefrom to obtain an envelope of the reception signal. That is, the amplitude detection unit 321 and the low-pass filter 322 detect the envelope (r(t)) of the reception signal.

The phase detection unit 323 detects the phase Φ(t) of the reception signal. More specifically, the phase detection unit 323 calculates the arctangent (i.e., arctan(I, Q)) of the I signal and the Q signal. The complex composition unit 324 subjects an output (i.e., the envelope detection result r(t) of the reception signal) of the low-pass filter 322 and an output (i.e., the phase detection result Φ(t) of the reception signal) of the phase detection unit 323 to complex composition as expressed by Eq. (6) and Eq. (7) below. The approximate replica signal for the reception signal is thus generated.

$$Q'(t)=r(t)\sin(\Phi(t)) \qquad (6)$$

$$I'(t)=r(t)\cos(\Phi(t)) \qquad (7)$$

The comparator 325 compares the output (i.e., the envelope detection result r(t) of the reception signal) of the low-pass filter 322 with a predetermined signal level TL, and outputs a signal representing the result of the comparison. This signal level TL is a threshold value, and the value thereof is arbitrary. For example, the signal level TL may be set to a value substantially twice that of the thermal noise level. For example, the comparator 325 outputs a value "0" (false) when the envelope detection result r(t) of the reception signal is at the signal level TL or lower, and outputs a value "1" (true) when the envelope detection result r(t) of the reception signal exceeds the signal level TL. That is, the comparator 325 determines whether or not the envelope detection result of the reception signal is at a high level exceeding that of the thermal noise.

The switch 326 controls supply of an output (i.e., the result of the complex composition, Q'(t) and I'(t)) of the complex composition unit 324 to the computation unit 232 in accordance with an output of the comparator 325. More specifically, the switch 326 supplies the complex composition result, Q'(t) and I'(t), to the computation unit 232 when the output of the comparator 325 is "1" (true), and stops the supply of the complex composition result, Q'(t) and I'(t), when the output of the comparator 325 is "0" (false). In the above-described manner, an approximate replica signal for a portion of the reception signal which (i.e., the envelope of which) exceeds the signal level TL is generated. That is, the approximate replica signal for the portion of the reception signal which (i.e., the envelope of which) exceeds the signal level TL is supplied to the computation unit 232.

That is, in this case, the computation unit 232 subtracts, as the approximate replica signal for the reception signal, the complex composition result of the phase detection result and the envelope detection result obtained by the complex composition unit 324 from the reception signal, with respect to a portion of the reception signal with respect to which the comparator 325 has determined that the envelope detection result exceeds the predetermined signal level TL.

Note that the amplitude of the reception signal can greatly fluctuate momentarily near a timing at which the reception signal exceeds the predetermined signal level TL, or near a timing at which the reception signal decreases in level below the predetermined signal level TL. In addition, the amplitude of the approximate replica signal can greatly fluctuate momentarily near a timing at which the approximate replica signal is started, or near a timing at which the approximate replica signal ends. Therefore, an output of the computation unit 232 can involve spikes in such time sections.

To remove such spikes, the limiter 312 subjects the output of the computation unit 232 to amplitude limiting such that the amplitude thereof will be at a predetermined signal level or lower. For example, the limiter 312 limits the amplitude to 1.5 times the predetermined signal level TL or lower. The magnitude of an amplitude limit imposed by the limiter 312 is arbitrary. It is desirable, however, that the magnitude thereof is substantially equal to that of the thermal noise level for the purpose of interference suppression. The complex low-pass filter 313 is a filter for subjecting an output of the limiter 312 to band limiting. That is, the limiter 312 and the complex low-pass filter 313 together function as a waveform shaping unit that shapes the waveform of a difference between the reception signal and the approximate replica signal obtained by the computation unit 232.

In the case of FIG. 25 also, large amplitude changes of the reception signal are eliminated by the approximate replica signal. That is, the signal level of a large interfering wave is also compressed to the predetermined signal level or lower, to be substantially equal to the thermal noise level.

Accordingly, the decoding processing unit 222 is able to detect and extract the signal (i.e., the transmission data) transmitted from the transmission apparatus 100 free from the influence (i.e., interference) of a large interfering wave. The reception apparatus 200 is thus able to suppress the reduction in the reception sensitivity.

<Flow of Interference Suppression Process>

Next, an example flow of the interference suppression process performed in this case will now be described below with reference to a flowchart of FIG. 26. Once the interference suppression process is started, the complex low-pass filter 311 subjects the reception signal to complex low-pass filtering at step S331. At step S332, the approximate replica generation unit 231 performs the approximate replica generation process, and thus generates the approximate replica signal from the reception signal subjected to the complex low-pass filtering at step S331. At step S333, the computation unit 232 subtracts the approximate replica signal generated at step S332 from the reception signal subjected to the complex low-pass filtering at step S331.

At step S334, the limiter 312 subjects a difference signal obtained by the process of step S333 and representing the difference between the approximate replica signal and the reception signal subjected to the complex low-pass filtering to limiting (i.e., the amplitude limiting). At step S335, the complex low-pass filter 313 subjects the difference signal subjected to the limiting to complex low-pass filtering. After the process of step S335 is finished, the interference suppression process is ended, and control returns to FIG. 8.

<Flow of Approximate Replica Generation Process>

Next, an example flow of the approximate replica generation process performed at step S332 in FIG. 26 will now be described below with reference to a flowchart of FIG. 27. In this case, once the approximate replica generation process is started, the amplitude detection unit 321 detects the amplitude of the reception signal subjected to the complex low-pass filtering at step S351. At step S352, the low-pass filter 322 subjects the result (i.e., an amplitude detection signal) of the amplitude detection obtained by the process of step S351 to low-pass filtering. At step S353, the phase detection unit 323 detects the phase of the reception signal subjected to the complex low-pass filtering. At step S354, the complex composition unit 324 subjects the envelope obtained by the process of step S352 and the phase detection result obtained by the process of step S353 to the complex composition.

At step S355, the comparator 325 determines whether or not the envelope obtained by the process of step S352 exceeds the predetermined threshold value TL. In a case where it is determined that the envelope exceeds the predetermined threshold value TL, control proceeds to step S356. At step S356, the switch 326 outputs, as the approximate replica signal, the complex composition result obtained by the process of step S354 to the computation unit 232. After the process of step S356 is finished, the approximate replica generation process is ended, and control returns to FIG. 26.

Meanwhile, in a case where it is determined at step S355 that the envelope obtained by the process of step S352 does not exceed the predetermined threshold value TL, the process of step S356 is omitted. That is, the output of the approximate replica signal to the computation unit 232 is omitted. Then, the approximate replica generation process is ended, and control returns to FIG. 26.

As a result of the interference suppression process and the approximate replica generation process being performed in the above-described manner, the signal level of the reception signal is compressed to the predetermined signal level or lower. Accordingly, the decoding processing unit 222 is able to detect and extract the signal (i.e., the transmission data) transmitted from the transmission apparatus 100 free from the influence (i.e., interference) of a large interfering wave. The reception apparatus 200 is thus able to suppress the reduction in the reception sensitivity.

5. Third Embodiment

<Interference Suppression Processing Unit>

Figure 28:
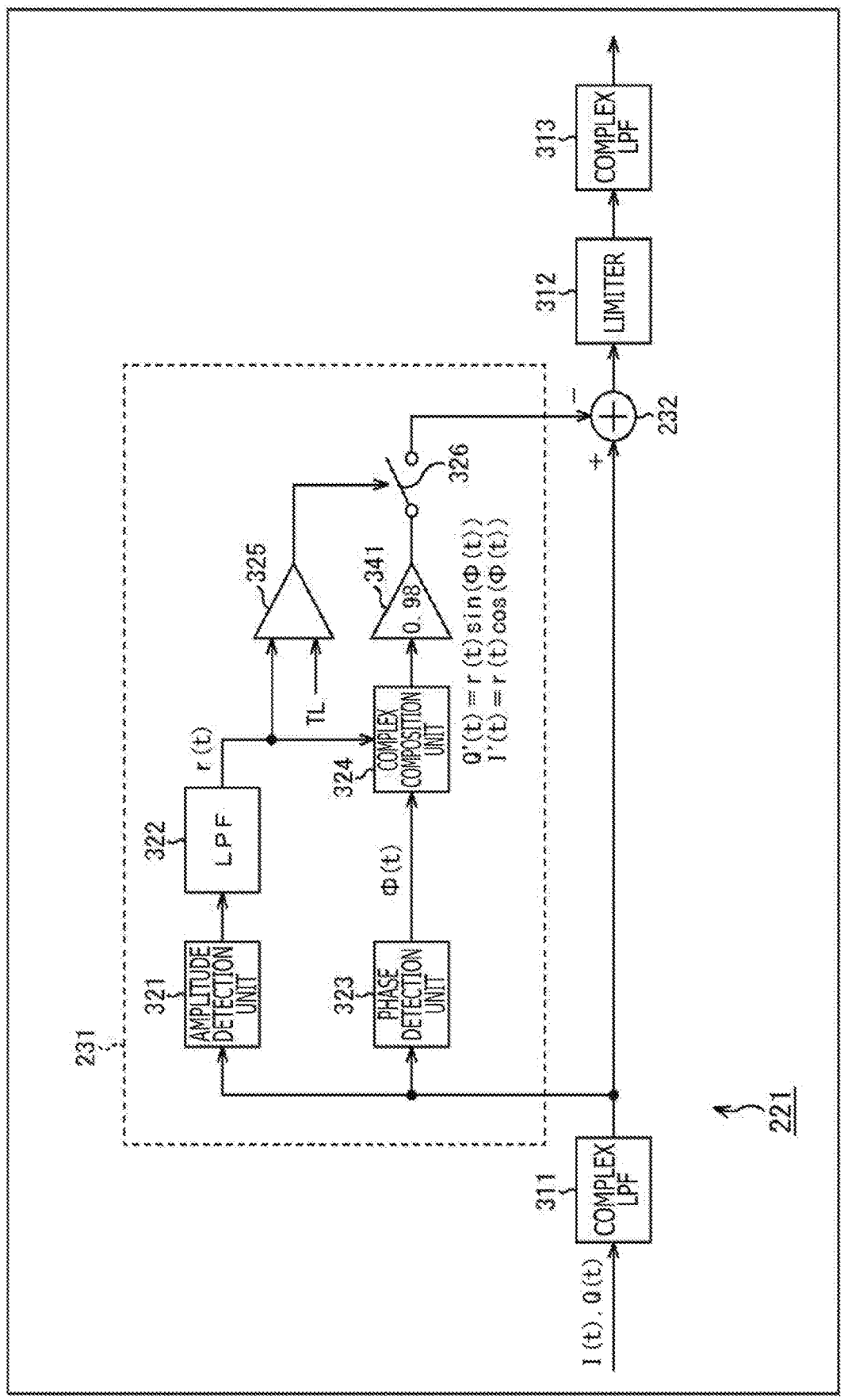
FIG. 28 is a diagram illustrating examples of primary functions of an interference suppression processing unit with an equivalent circuit.

FIG. 28 illustrates yet another example of an equivalent circuit representing a process performed by an interference suppression processing unit 221. In the example illustrated in FIG. 28, an approximate replica generation unit 231 of the interference suppression processing unit 221 further includes an amplification unit 341 in addition to the components illustrated in FIG. 25.

The amplification unit 341 amplifies the amplitude of an output of a complex composition unit 324, that is, the result (i.e., the complex composition result, Q'(t) and I'(t)) of subjecting the phase detection result and the envelope detection result to the complex composition, at a predetermined amplification factor. In this case, the amplification factor has a value less than one. In the case of the example illustrated in FIG. 28, the amplification factor is 0.98. That is, the signal level of the approximate replica signal is reduced. Accordingly, it can be also said that the amplification unit 341 functions as an attenuation unit that attenuates the amplitude of the complex composition result at a predetermined attenuation factor.

A switch 326 controls supply of an output (i.e., the attenuated complex composition result, Q'(t) and I'(t)) of the amplification unit 341 to a computation unit 232 in accordance with an output of a comparator 325. More specifically, the switch 326 supplies the attenuated complex composition result, Q'(t) and I'(t), to the computation unit 232 in a case where the output of the comparator 325 is "1" (true), and stops the supply of the attenuated complex composition result, Q'(t) and I'(t), in a case where the output of the comparator 325 is "0" (false). In the above-described manner, an approximate replica signal for a portion of the reception signal which (i.e., the envelope of which) exceeds the signal level TL is generated. That is, the approximate replica signal for the portion of the reception signal which (i.e., the envelope of which) exceeds the signal level TL is supplied to the computation unit 232.

The above arrangement, which leaves a few components of the approximate replica signal in the reception signal, can reduce the possibility that transmission data transmitted from the transmission apparatus 100 will be eliminated by mistake.

<Flow of Approximate Replica Generation Process>

Figure 29:
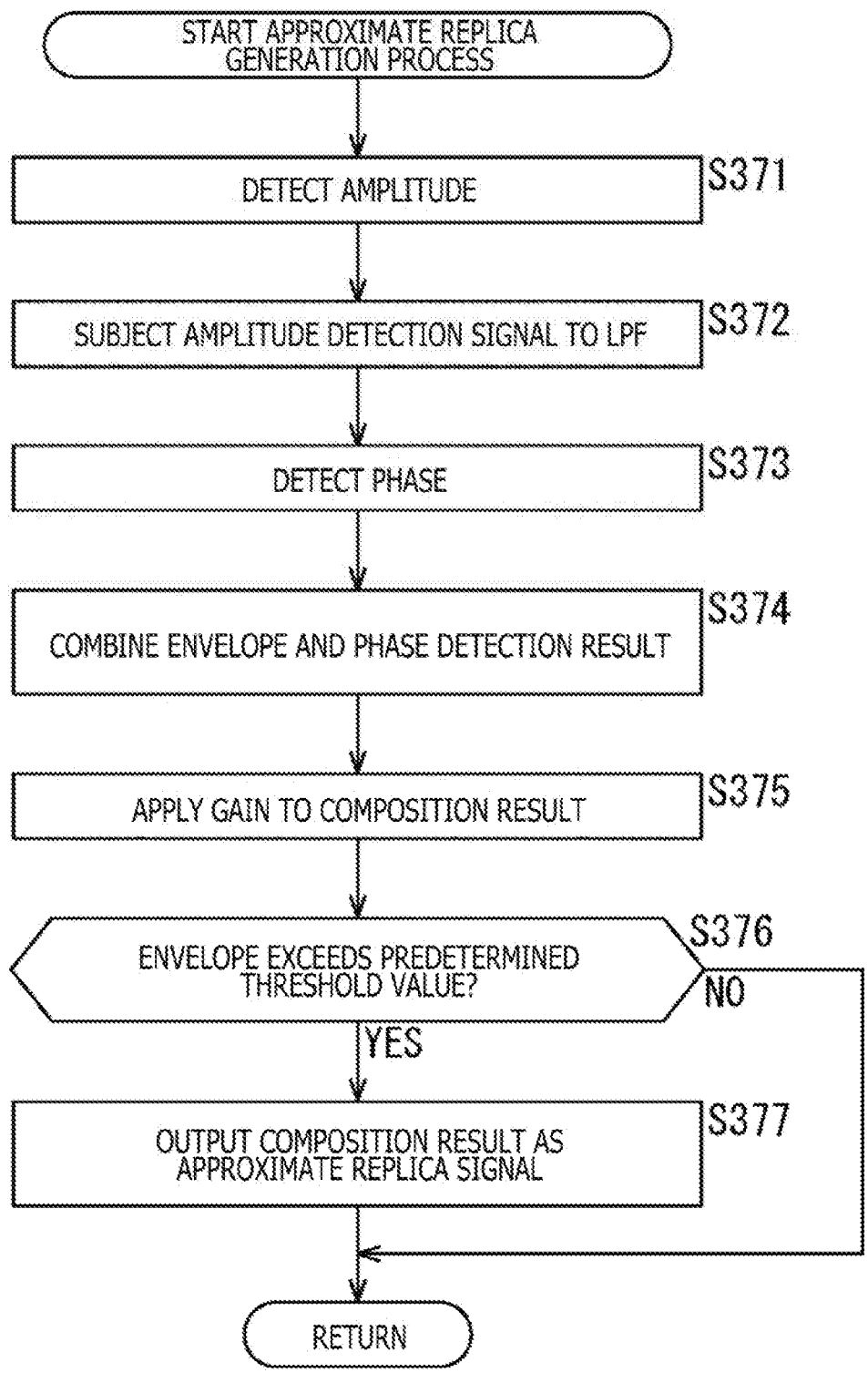
FIG. 29 is a flowchart for explaining an example flow of an approximate replica generation process.

An example flow of the approximate replica generation process performed at step S332 in FIG. 26 will now be described below with reference to a flowchart of FIG. 29. In this case, once the approximate replica generation process is started, processes of steps S371 to S374 are performed in the same manners as the processes of steps S351 to S354, respectively, in FIG. 27.

At step S375, the amplification unit 341 applies a gain to the complex composition result obtained by the process of step S374 at the predetermined amplification factor.

Figure 27:
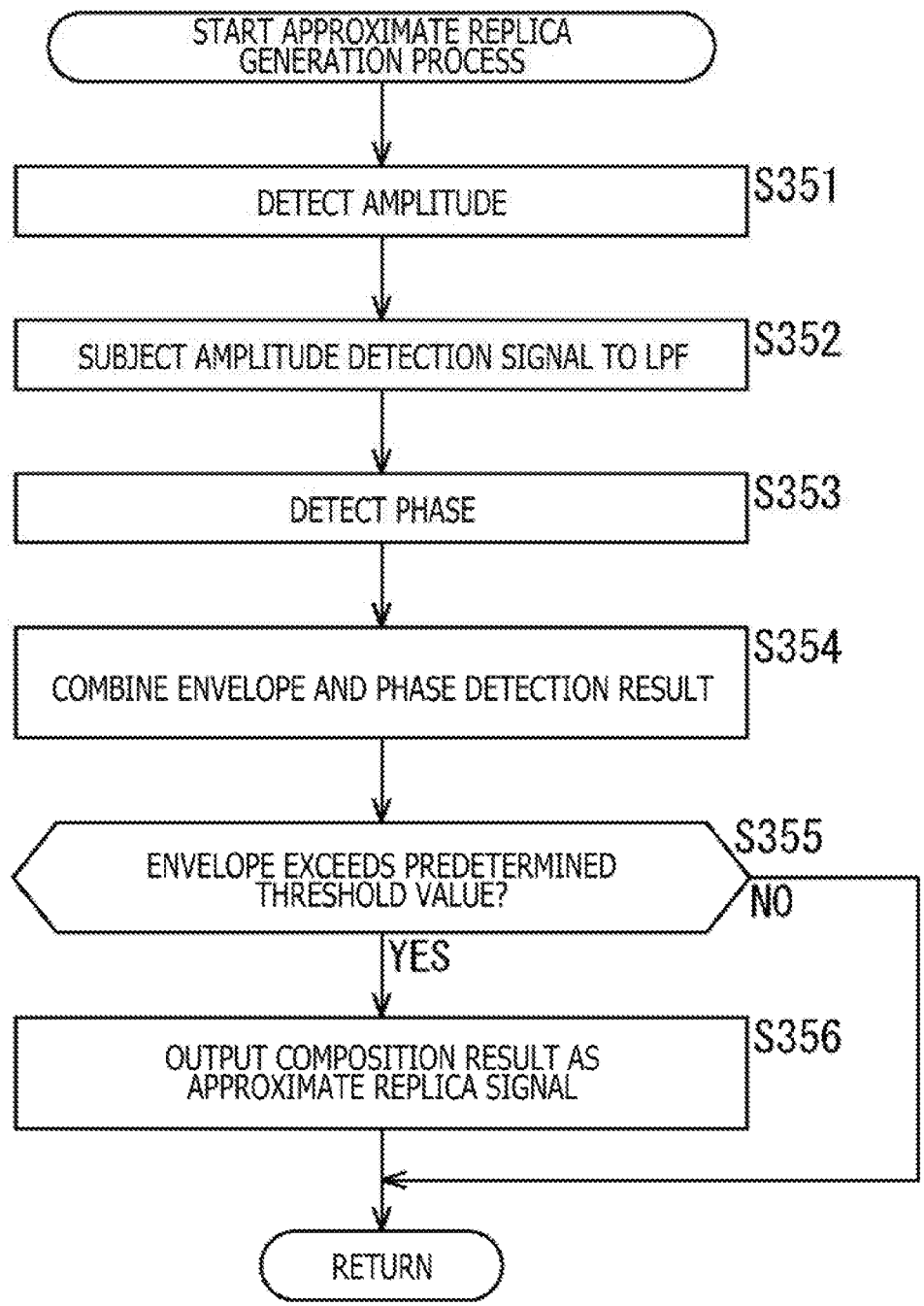
FIG. 27 is a flowchart for explaining an example flow of an approximate replica generation process.

Processes of steps S376 and S377 are performed in the same manners as the processes of steps S355 and S356, respectively, in FIG. 27.

Figure 26:
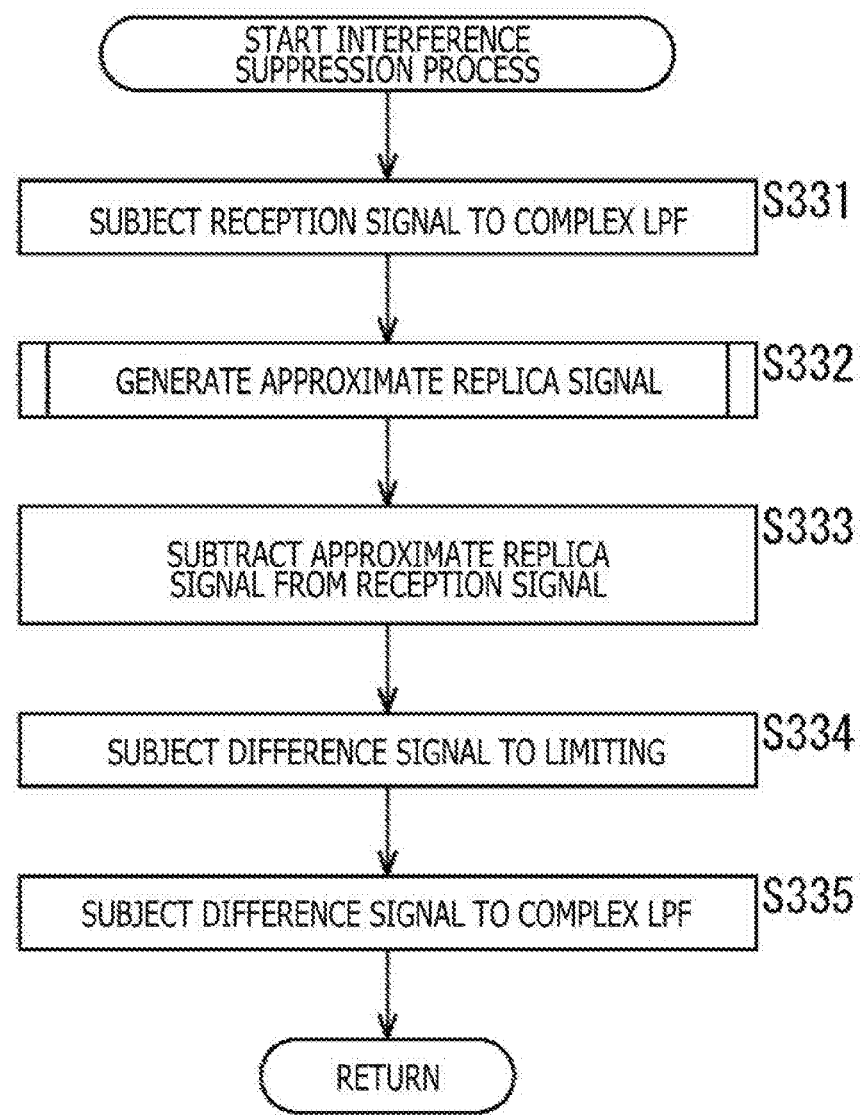
FIG. 26 is a flowchart for explaining an example flow of an interference suppression process.

After the process of step S376 or step S377 is finished, the approximate replica generation process is ended, and control returns to FIG. 26.

As a result of the interference suppression process and the approximate replica generation process being performed in the above-described manners, the signal level of the reception signal is compressed to the predetermined signal level or lower. Accordingly, the decoding processing unit 222 is able to detect and extract the signal (i.e., the transmission data) transmitted from the transmission apparatus 100 free from the influence (i.e., interference) of a large interfering wave. The reception apparatus 200 is thus able to suppress the reduction in the reception sensitivity.

6. Fourth Embodiment

<Interference Suppression Processing Unit>

Figure 30:
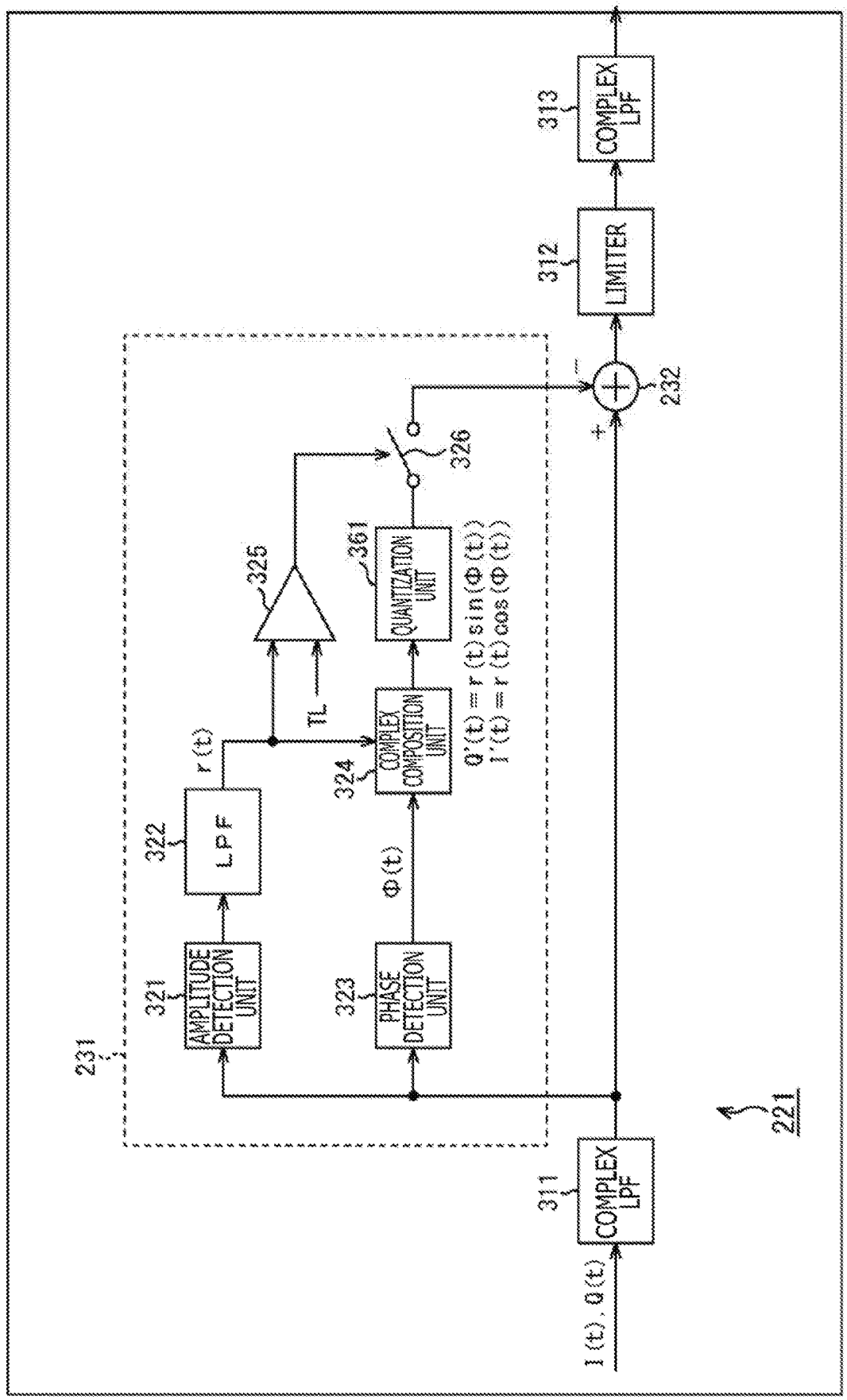
FIG. 30 is a diagram illustrating examples of primary functions of an interference suppression processing unit with an equivalent circuit.

FIG. 30 illustrates yet another example of an equivalent circuit representing a process performed by an interference suppression processing unit 221. In the example illustrated in FIG. 30, an approximate replica generation unit 231 of the interference suppression processing unit 221 further includes a quantization unit 361 in place of the amplification unit 341 in FIG. 28.

The quantization unit 361 coarsely quantizes an output of a complex composition unit 324, that is, the result (i.e., the complex composition result, Q'(t) and I'(t)) of subjecting the phase detection result and the envelope detection result to the complex composition. That is, the quantization unit 361 reduces the bit depth of the approximate replica signal, increasing the roughness thereof.

A switch 326 controls supply of an output (i.e., the quantized complex composition result, Q'(t) and I'(t)) of the quantization unit 361 to a computation unit 232 in accordance with an output of a comparator 325. More specifically, the switch 326 supplies the quantized complex composition result, Q'(t) and I'(t), to the computation unit 232 in a case where the output of the comparator 325 is "1" (true), and stops the supply of the quantized complex composition result, Q'(t) and I'(t), in a case where the output of the comparator 325 is "0" (false). In the above-described manner, an approximate replica signal for a portion of the reception signal which (i.e., the envelope of which) exceeds the signal level TL is generated. That is, the approximate replica signal for the portion of the reception signal which (i.e., the envelope of which) exceeds the signal level TL is supplied to the computation unit 232.

The above arrangement, which leaves a few components of the approximate replica signal prior to the quantization in the reception signal, can reduce the possibility that transmission data transmitted from the transmission apparatus 100 will be eliminated by mistake.

<Flow of Approximate Replica Generation Process>

Figure 31:
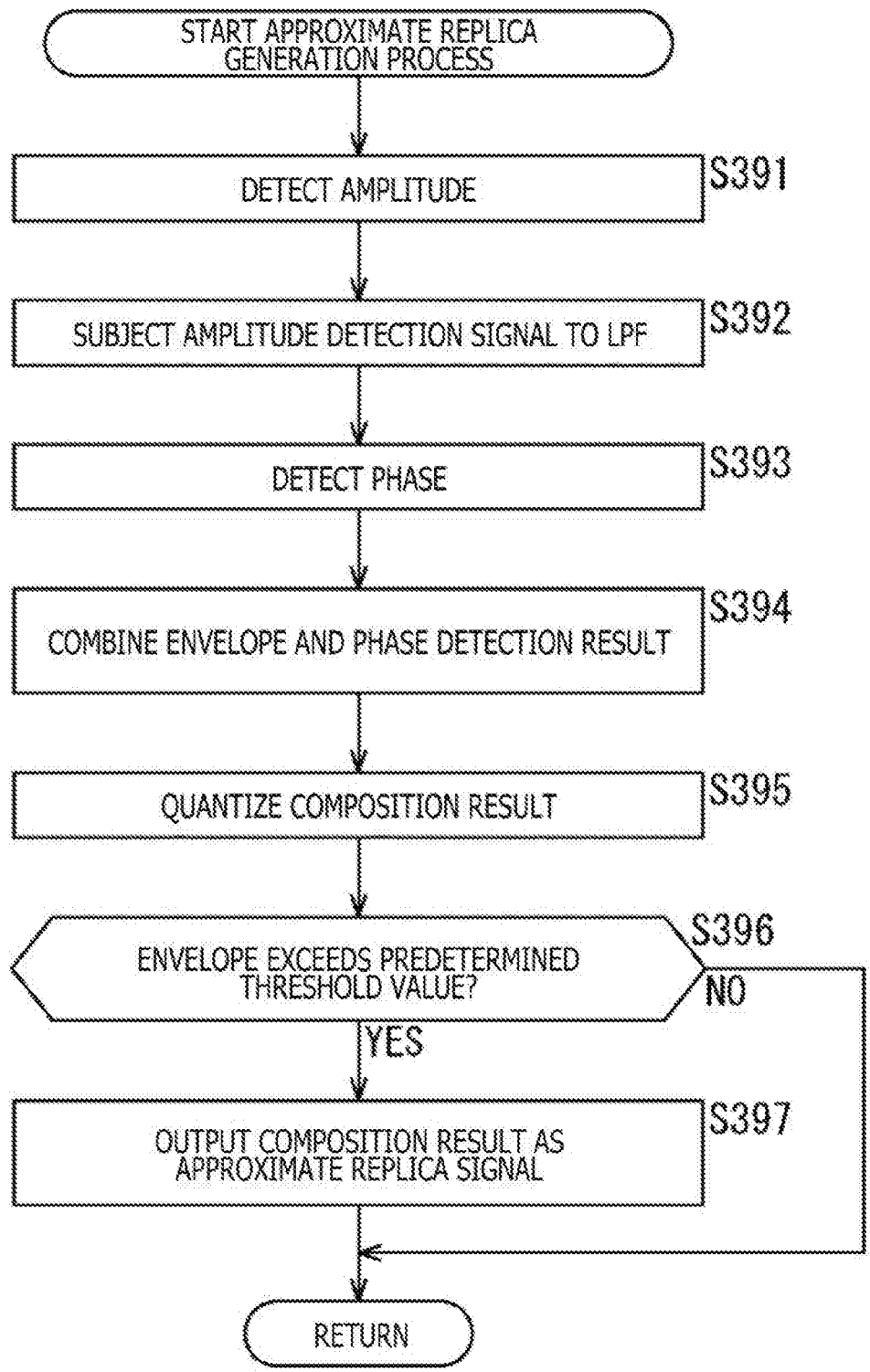
FIG. 31 is a flowchart for explaining an example flow of an approximate replica generation process.

An example flow of the approximate replica generation process performed at step S332 in FIG. 26 will now be described below with reference to a flowchart of FIG. 31. In this case, once the approximate replica generation process is started, processes of steps S391 to S394 are performed in the same manners as the processes of steps S351 to S354, respectively, in FIG. 27.

At step S395, the quantization unit 361 applies a gain to the complex composition result obtained by the process of step S394 at a predetermined amplification factor.

Processes of steps S396 and S397 are performed in the same manners as the processes of steps S355 and S356, respectively, in FIG. 27.

After the process of step S396 or step S397 is finished, the approximate replica generation process is ended, and control returns to FIG. 26.

As a result of the interference suppression process and the approximate replica generation process being performed in the above-described manners, the signal level of the reception signal is compressed to the predetermined signal level or lower. Accordingly, the decoding processing unit 222 is able to detect and extract the signal (i.e., the transmission data) transmitted from the transmission apparatus 100 free from the influence (i.e., interference) of a large interfering wave. The reception apparatus 200 is thus able to suppress the reduction in the reception sensitivity.

7. Others

<Interference Suppression Processing Unit>

Note that the above-described interference suppression process may be performed outside of the CPU 220. For example, the interference suppression processing unit 221 may be provided between the A/D conversion unit 218 and the memory 219, and the interference suppression process may be performed in the interference suppression processing unit 221. In this case, the interference suppression processing unit 221 may be implemented in either hardware or software, as long as the interference suppression processing unit 221 has the functions of any of the equivalent circuits illustrated in FIGS. 7, 25, 28, and 30. Also note that, for example, an analog circuit (i.e., an interference suppression circuit) equivalent to any of the equivalent circuits illustrated in FIGS. 7, 25, 28, and 30 may be provided between the A/D conversion unit 218 and each of the multiplication unit 215 and the multiplication unit 217, and that the interference suppression process may be performed in the analog circuit.

<Application to Apparatuses>

The present technology is applicable not only to the above-described reception apparatus 200, but to any apparatus that is capable of performing a process on a reception signal transmitted from the transmission apparatus 100. The present technology is applicable to, for example, a signal processing apparatus and an information processing apparatus that perform a process on a reception signal received from another apparatus. The present technology is also applicable to, for example, a transmission/reception apparatus and a communication apparatus that have a receiving function of the above-described reception apparatus 200 and, further, a transmitting function of transmitting a signal. Needless to say, the present technology is also applicable to an apparatus that has not only the signal processing function but also another arbitrary function, such as, for example, an imaging function, an image display function, or the like.

<Specifications of Communication>

Note that specifications of communication described above are merely an example, and that the specifications of communication are not limited to the above-described example. Any desired specifications of communication may be adopted as long as they allow decoding of transmission data included in a reception signal having a signal level equal to or lower than a predetermined signal level, e.g., a thermal noise level or the like.

For example, while the example of transmitting 100 frames of 0.2 seconds in 30 seconds has been described above, these numerical values are merely examples and are not essential to the present technology. For example, the number of frames transmitted may be changed as necessary. Also note that the reception apparatus 200 may be configured to return ACK information (i.e., acknowledgment information) to the transmission apparatus 100, and that the transmission of frames may be stopped when the ACK information is returned.

Also note that, although it has been assumed in the foregoing description that all the transmission signals transmitted with the 100 frames are identical, the present technology is not limited to this example. For example, in a case such as the case where frame numbers are identifiable on the transmitting and receiving sides, it may be so arranged that a Gold sequence (i.e., a spreading sequence) can be changed for each frame number.

Also note that, although it has been assumed in the foregoing description that all the 100 frames transmitted are detected, the present technology is not limited to this example. For example, only 98 of the 100 frames may be detected, with the influence of noise or the like taken into consideration.

Also note that, although it has been assumed in the foregoing description that the wireless signal (i.e., the transmission signal TX) received by the reception apparatus 200 has been subjected to the BPSK modulation, the amount of phase shift may be arbitrary and is not limited to this example. For example, the wireless signal may be subjected to QPSK modulation (i.e., quadrature phase-shift keying modulation). In this case also, the reception apparatus 200 may be configured to generate the same pseudorandom sequence as the transmission apparatus 100, and use the pseudorandom sequence for the decoding.

Also note that, although it has been assumed in the foregoing description that the reception apparatus 200 receives the transmission signal TX in the form of a wireless signal, the reception apparatus 200 may be configured to receive the transmission signal TX transmitted via an arbitrary wired communication medium.

<Application to Systems>

Note that any desired information may be transmitted and received between the transmission apparatus 100 and the reception apparatus 200 described above. For example, an image, an audio, measurement data, identification information for a device or the like, parameter setting information, control information such as a command, or the like may be transmitted and received therebetween. Also note that the information transmitted and received therebetween may include a plurality of types of information, such as, for example, an image and an audio, or identification information, setting information, and control information.

Also note that, although it has been assumed in the foregoing description that the transmission apparatus 100 transmits the weather observation data, the information transmitted and received may have an arbitrary content, and is not limited to the weather observation data. For example, the transmission apparatus 100 may be configured to generate and transmit transmission information including information (i.e., sensor output) outputted from any of various types of sensors that, for example, detect or measure an arbitrary variable or the amount of change therein. Examples of the arbitrary variable include an image, light, luminosity, saturation, electricity, sound, vibration, acceleration, speed, angular velocity, force, temperature (not a temperature distribution), humidity, distance, area, volume, shape, flow rate, time, time period, magnetism, a chemical substance, and odor.

That is, an apparatus to which the present technology is applied may be used in a system used for any desired purpose, examples of which include three-dimensional shape measurement, space measurement, object observation, movement/deformation observation, biometric observation, authentication processing, monitoring, autofocus, imaging control, illumination control, tracking processing, input/output control, electronic device control, and actuator control. In other words, the present technology is applicable to any desired system.

For example, the present technology is applicable to systems in any desired fields, examples of which include traffic, medicine, crime prevention, agriculture, the livestock industry, mining, the cosmetic industry, factories, household electrical appliances, meteorology, and natural surveillance. For example, the present technology is applicable also to a system that involves capturing an image to be offered for appreciation purposes using a digital camera, a portable device having a camera function, or the like. In addition, the present technology is applicable also to, for example, systems used for traffic purposes, examples of which include: onboard systems that involve photographing spaces in front of and behind an automobile, surroundings thereof, an interior thereof, and so on, for example, for safe driving, e.g., for automatic stop, or for a recognition of the condition of a driver; a surveillance camera system that monitors a traveling vehicle and a road; and a distance measuring system that measures the distance between, for example, vehicles. Further, the present technology is applicable also to, for example, systems used for security purposes which involve use of a surveillance camera for crime prevention, a camera for person authentication, or the like. In addition, the present technology is applicable also to, for example, systems used for sports which involve use of, for example, any of various types of sensors that are usable for sports applications or the like, such as wearable cameras. Further, the present technology is applicable also to, for example, systems used for agriculture which involve use of any of various types of sensors, such as a camera for monitoring the conditions of a field and crops. In addition, the present technology is applicable also to, for example, systems used for the livestock industry which involve use of any of various types of sensors for monitoring the conditions of livestock, such as pigs or cattle. Further, the present technology is applicable also to, for example, systems for monitoring the conditions of nature, such as volcanoes, forests, or oceans; weather observation systems for observing weather, atmospheric temperature, humidity, wind speed, duration of sunshine, and so on; and systems for observing the ecology of wildlife, such as birds, fishes, reptiles, amphibians, mammals, insects, plants, and so on.

The present technology is applicable also to, for example, a position management system for managing the position of the transmission apparatus 100 in which the transmission apparatus 100 provides position information indicative of the position of the transmission apparatus 100 itself, and a server acquires the position information via the reception apparatus 200. This system can be used, for example, as a system for managing the position of a position monitoring target, such as the elderly, for the sake of safety or the like by causing the position monitoring target to carry the transmission apparatus 100. This system can also be used, for example, as an anti-theft system that monitors the position of the transmission apparatus 100 for the purpose of, for example, preventing a theft, with the transmission apparatus 100 being installed on an automobile, a motorcycle, or the like.

<Computer>

The above-described series of processes can be implemented either in hardware or in software. In addition, some of the processes may be implemented in hardware, with the other processes being implemented in software. In a case where the series of processes is implemented in software, a program that forms the software is installed onto a computer. Examples of such a computer include a computer having a dedicated hardware configuration, and a general-purpose personal computer or the like, for example, that, when various programs are installed thereon, becomes capable of performing various functions.

Figure 32:
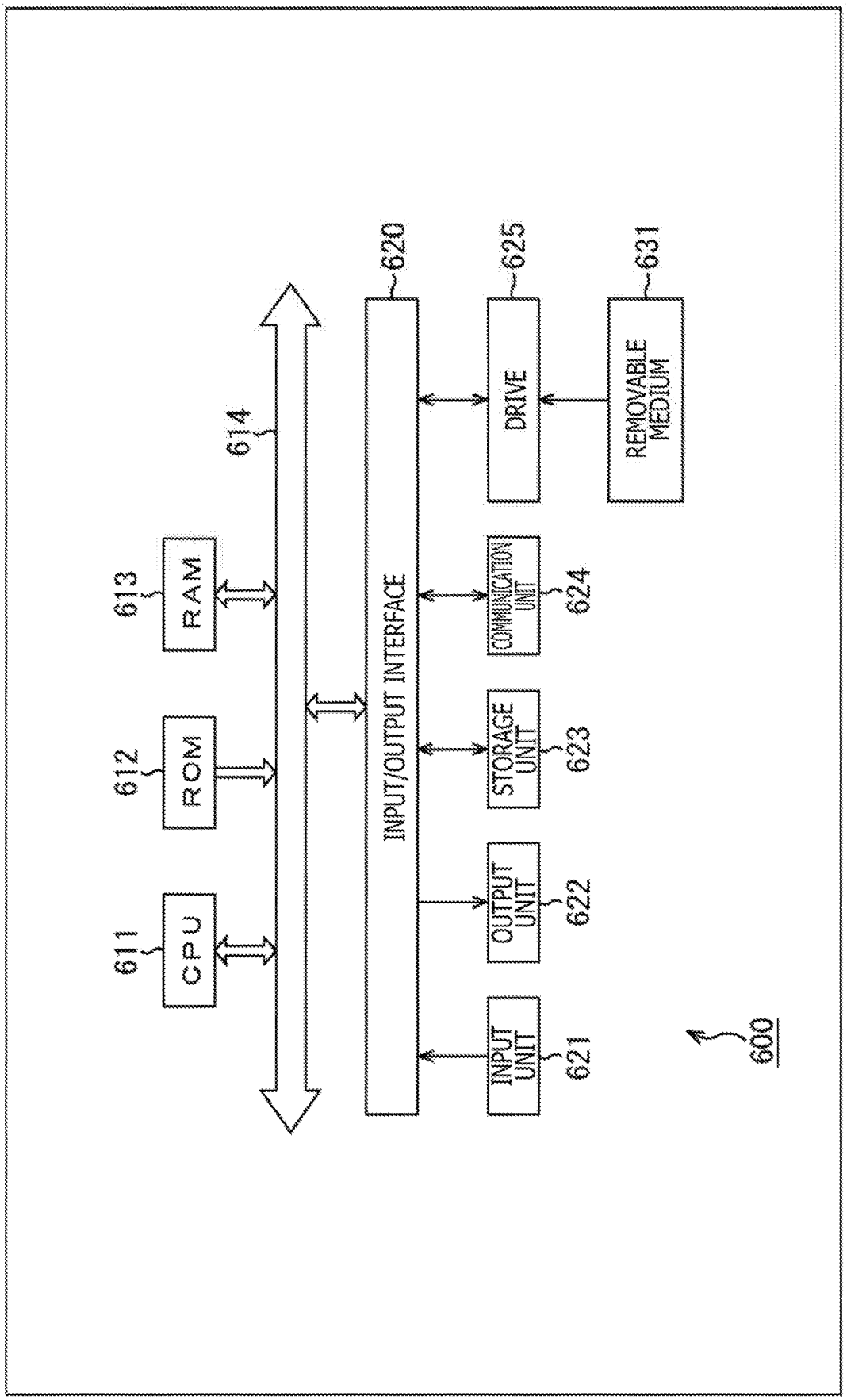
FIG. 32 is a block diagram illustrating a configuration example of primary parts of a computer.

FIG. 32 is a block diagram illustrating an exemplary hardware configuration of a computer that performs the above-described series of processes in accordance with the program.

In a computer 600 illustrated in FIG. 32, a CPU 611, a ROM (Read Only Memory) 612, and a RAM (Random Access Memory) 613 are connected to one another via a bus 614. An input/output interface 620 is also connected to the bus 614. An input unit 621, an output unit 622, a storage unit 623, a communication unit 624, and a drive 625 are connected to the input/output interface 620.

The input unit 621 is formed by, for example, a keyboard, a mouse, a microphone, a touchscreen panel, an input terminal, and/or the like. The output unit 622 is formed by, for example, a display, a loudspeaker, and/or an output terminal. The storage unit 623 is formed by, for example, a hard disk, a RAM disk, a nonvolatile memory, and/or the like. The communication unit 624 is formed by, for example, a network interface. The drive 625 drives a removable medium 631, such as a magnetic disk, an optical disk, a magneto-optical disk, a semiconductor memory, or the like.

In the computer 600 having the above-described configuration, the CPU 611 loads the program stored in the storage unit 623, for example, into the RAM 613 via the input/output interface 620 and the bus 614, and executes the loaded program to perform the above-described series of processes. In the RAM 613, data necessary for the CPU 611 to perform various processes and so on are also stored as appropriate.

The program to be executed by the computer 600 (i.e., the CPU 611) may be recorded on the removable medium 631, which may be a packaged medium or the like, for example, and be thus applied. In this case, the program can be installed into the storage unit 623 via the input/output interface 620 when the removable medium 631 is mounted on the drive 625. Alternatively, this program may be provided via a wired or wireless communication medium, such as a local area network, the Internet, or digital satellite broadcasting. In this case, the program can be received via the communication unit 624 and be installed into the storage unit 623. Alternatively, this program may be installed in the ROM 612 or the storage unit 623 beforehand.

<Supplements>

Note that embodiments of the present technology are not limited to the above-described embodiments, and it should be understood that various modifications are possible without departing from the scope of the gist of the present technology.

For example, the present technology can be implemented by any structure that forms an apparatus or a system, such as, for example, a processor as a system LSI (Large Scale Integration) or the like, a module using a plurality of processors or the like, a unit using a plurality of modules or the like, or a set formed by a unit with an additional function added thereto (i.e., a part of an apparatus).

It is assumed herein that a system refers to a collection of a plurality of constituent elements (e.g., apparatuses, modules (parts), etc.) regardless of whether or not all the constituent elements are contained in the same casing. Therefore, a plurality of apparatuses that are housed in separate casings and which are connected via a network, and a single apparatus having a plurality of modules housed in a single casing, can both be referred to as systems.

In addition, for example, components incorporated in a single apparatus (or processing unit) in the foregoing description may be divided and incorporated separately into a plurality of apparatuses (or processing units). Conversely, components that have been described above as being contained in separate apparatuses (or processing units) may be incorporated into a single apparatus (or processing unit). Further, another component that has not been mentioned above may naturally be added to any apparatus (or processing unit) described above. Furthermore, as long as the configuration and operation of the system as a whole remain essentially the same, some of the components of one apparatus (or processing unit) may instead be contained in another apparatus (or another processing unit).

Furthermore, for example, the present technology can be implemented by cloud computing, in which a single function is realized by a plurality of apparatuses cooperating and sharing processes via a network.

Furthermore, for example, the above-described program can be executed in an arbitrary apparatus. In this case, it is sufficient that the apparatus is configured to have required functions (e.g., functional blocks) and be capable of acquiring necessary information.

Furthermore, for example, each of the steps described above with reference to the flowcharts may be performed by a single apparatus, or can alternatively be performed by a plurality of cooperating apparatuses. Furthermore, in a case where one step includes a plurality of processes, the plurality of processes included in the one step can be performed by a single apparatus, or may alternatively be performed by a plurality of cooperating apparatuses. In other words, a plurality of processes included in one step can be performed as processes of separate steps. Conversely, processes that have been described above as being performed at separate steps can be performed collectively at a single step.

The program to be executed by the computer may be designed to cause processes of steps of the program to be performed chronologically in an order as described herein, or to cause some of the processes to be performed in parallel or performed individually at a timing when they need be performed, such as when a call has been issued. In other words, the processes of the respective steps may be performed in orders different from those described above as long as no conflict arises. Furthermore, the processes of the steps of the program may be performed in parallel with a process of another program, or may be performed in combination with a process of another program.

Each of the embodiments of the present technology which have been described herein can be implemented independently and singly as long as no conflict arises. Needless to say, an arbitrary combination of two or more of the embodiments of the present technology can be implemented together. For example, a part or the whole of one of the embodiments of the present technology described above can be implemented in combination with a part or the whole of another one of the embodiments of the present technology described above. Further, a part or the whole of any of the embodiments of the present technology described above can be implemented together with another technology not described above.

The present technology can have the following configurations.

(1) A signal processing apparatus including:
 a signal compression unit configured to compress a reception signal so as to have a predetermined signal level or lower; and
 a decoding unit configured to decode transmission data transmitted from a transmitter side, the transmission data being included in the reception signal compressed by the signal compression unit so as to have the signal level or lower.

(2) The signal processing apparatus as recited in (1), in which
 the signal compression unit includes
  an approximate replica generation unit configured to generate an approximate replica signal reproducing large amplitude changes of the reception signal, and
  a subtraction unit configured to subtract the approximate replica signal generated by the approximate replica generation unit from the reception signal.

(3) The signal processing apparatus as recited in (2), in which
 the approximate replica generation unit includes a quantization unit configured to coarsely quantize the reception signal, and
 the subtraction unit is configured to subtract, as the approximate replica signal, the quantized reception signal obtained by the quantization unit from the reception signal.

(4) The signal processing apparatus as recited in (3), in which
 the quantization unit quantizes the reception signal from a bit depth of 16 bits to a bit depth of 4 bits.

(5) The signal processing apparatus as recited in (2), in which
 the approximate replica generation unit generates an approximate replica signal for a portion of the reception signal which exceeds the signal level.

(6) The signal processing apparatus as recited in (5), in which
 the approximate replica generation unit includes
  a phase detection unit configured to detect a phase of the reception signal,
  an envelope detection unit configured to detect an envelope of the reception signal,
  a complex composition unit configured to subject a phase detection result of the reception signal obtained by the phase detection unit and an envelope detection result of the reception signal obtained by the envelope detection unit to complex composition, and
  a determination unit configured to determine whether or not the envelope detection result of the reception signal obtained by the envelope detection unit exceeds the signal level, and
 the subtraction unit is configured to subtract, as the approximate replica signal, a complex composition result of the phase detection result and the envelope detection result obtained by the complex composition unit from the reception signal, with respect to a portion of the reception signal with respect to which the determination unit has determined that the envelope detection result exceeds the signal level.

(7) The signal processing apparatus as recited in (6), in which
the approximate replica generation unit further includes an attenuation unit configured to attenuate an amplitude of the complex composition result at a predetermined attenuation factor, and
the subtraction unit is configured to subtract, as the approximate replica signal, the complex composition result with the amplitude thereof attenuated at the attenuation factor by the attenuation unit from the reception signal, with respect to the portion of the reception signal with respect to which the determination unit has determined that the envelope detection result exceeds the signal level.

(8) The signal processing apparatus as recited in (6), in which
the approximate replica generation unit further includes a quantization unit configured to coarsely quantize an amplitude of the complex composition result, and
the subtraction unit is configured to subtract, as the approximate replica signal, the complex composition result quantized by the quantization unit from the reception signal, with respect to the portion of the reception signal with respect to which the determination unit has determined that the envelope detection result exceeds the signal level.

(9) The signal processing apparatus as recited in any one of (2) to (8), in which
the signal compression unit further includes a waveform shaping unit configured to shape a waveform of a difference between the reception signal and the approximate replica signal obtained by the subtraction unit.

(10) The signal processing apparatus as recited in (9), in which
the waveform shaping unit includes a limiting unit configured to limit an amplitude of the difference to a predetermined signal level or lower.

(11) The signal processing apparatus as recited in (9) or (10), in which
the waveform shaping unit includes a low-pass filter configured to limit high-frequency components of the difference.

(12) The signal processing apparatus as recited in any one of (2) to (11), in which
the signal compression unit includes a low-pass filter configured to limit high-frequency components of the reception signal.

(13) The signal processing apparatus as recited in any one of (1) to (12), in which
the signal level includes a thermal noise level.

(14) A signal processing method including:
compressing a reception signal so as to have a predetermined signal level or lower; and
decoding transmission data transmitted from a transmitter side, the transmission data being included in the reception signal compressed so as to have the signal level or lower.

REFERENCE SIGNS LIST

200 Reception apparatus, 220 CPU, 221 Interference suppression processing unit, 222 Decoding processing unit, 231 Approximate replica generation unit, 232 Computation unit, 241 Quantization unit, 311 Complex low-pass filter, 312 Limiter, 313 Complex low-pass filter, 321 Amplitude detection unit, 322 Low-pass filter, 323 Phase detection unit, 324 Complex composition unit, 325 Comparator, 326 Switch, 341 Amplification unit, 361 Quantization unit, 600 Computer

The invention claimed is:

1. A signal processing apparatus, comprising:
a central processing unit (CPU) configured to:
receive a reception signal from a transmitter side, wherein the received reception signal includes transmission data;
detect an envelope of the received reception signal to obtain an envelope detection result of the reception signal;
detect a phase of the received reception signal;
subject a phase detection result of the detection of the phase of the received reception signal and the envelope detection result of the received reception signal to complex composition to obtain a complex composition result;
quantize a complex composition signal of the complex composition result from a bit depth of 16 bits to a bit depth of 4 bits;
determine whether the envelope detection result of a portion of the received reception signal exceeds a first signal level;
subtract, as an approximate replica signal, the quantized complex composition signal from the received reception signal to obtain a specific signal, wherein
the quantized complex composition signal is subtracted from the received reception signal based on the determination that the envelope detection result of the portion of the received reception signal exceeds the first signal level,
the specific signal has one of the first signal level or a second signal level lower than the first signal level,
the approximate replica signal corresponds to large amplitude changes of the received reception signal, and
the large amplitude changes of the received reception signal are larger than a threshold value; and
decode the transmission data in the specific signal.

2. The signal processing apparatus according to claim 1, wherein
the CPU is further configured to generate the approximate replica signal for the portion of the received reception signal, and
the portion of the received reception signal has a third signal level greater than the first signal level.

3. The signal processing apparatus according to claim 1, wherein the CPU is further configured to:
quantize an amplitude of the complex composition signal; and
subtract, as the approximate replica signal, the quantized complex composition signal from the received reception signal based on the quantization of the amplitude of the complex composition signal.

4. The signal processing apparatus according to claim 1, wherein the CPU is further configured to shape a waveform of a difference between the received reception signal and the approximate replica signal.

5. The signal processing apparatus according to claim 4, configured to limit an amplitude of the difference to the first signal level or the second signal level.

6. The signal processing apparatus according to claim 4, further comprising a low-pass filter configured to limit high-frequency components of the difference between the received reception signal and the approximate replica signal.

7. The signal processing apparatus according to claim 1, further comprising a low-pass filter configured to limit high-frequency components of the received reception signal.

8. The signal processing apparatus according to claim 1, wherein the first signal level includes a thermal noise level.

9. A signal processing method, comprising:
- receiving a reception signal from a transmitter side, wherein the received reception signal includes transmission data;
- detecting an envelope of the received reception signal to obtain an envelope detection result of the reception signal;
- detecting a phase of the received reception signal;
- subjecting a phase detection result of the detection of the phase of the received reception signal and the envelope detection result of the received reception signal to complex composition to obtain a complex composition result;
- quantizing a complex composition signal of the complex composition result from a bit depth of 16 bits to a bit depth of 4 bits;
- determining whether the envelope detection result of a portion of the received reception signal exceeds a first signal level;
- subtracting, as an approximate replica signal, the quantized complex composition signal from the received reception signal to obtain a specific signal, wherein
  - the quantized complex composition signal is subtracted from the received reception signal based on the determination that the envelope detection result of the portion of the received reception signal exceeds the first signal level,
  - the specific signal has one of the first signal level or a second signal level lower than the first signal level,
  - the approximate replica signal corresponds to large amplitude changes of the received reception signal, and
  - the large amplitude changes of the received reception signal are larger than a threshold value; and
- decoding the transmission data in the specific signal.

* * * * *